United States Patent [19]

Yamazaki et al.

[11] 4,245,257
[45] Jan. 13, 1981

[54] TRANSMISSION METHOD AND SYSTEM FOR FACSIMILE SIGNAL

[75] Inventors: Yasuhiro Yamazaki, Hiratsuka; Yasushi Wakahara, Tokyo; Kiyohiro Yuuki; Toyomichi Yamada, both of Yokosuka, all of Japan

[73] Assignee: Kokusai Denshin Denwa Kabushiki Kaisha, Tokyo, Japan

[21] Appl. No.: 62,036

[22] Filed: Jul. 30, 1979

[30] Foreign Application Priority Data

Jul. 31, 1978 [JP] Japan ................................. 53-92533
Dec. 13, 1978 [JP] Japan ................................. 53-154716
Jan. 24, 1979 [JP] Japan ................................. 54-6030

[51] Int. Cl.³ .......................... H04N 1/00; G08C 9/00
[52] U.S. Cl. .................................. 358/260; 358/261; 340/347 DD
[58] Field of Search ..................... 358/260, 261, 133; 340/347 DD; 364/515

[56] References Cited

U.S. PATENT DOCUMENTS

| | | | |
|---|---|---|---|
| 3,927,251 | 12/1975 | White et al. | 358/261 |
| 4,040,093 | 8/1977 | Nakagome et al. | 358/261 |
| 4,115,815 | 9/1978 | Nakagome et al. | 358/260 |
| 4,117,517 | 9/1978 | Shintani et al. | 358/260 |
| 4,121,258 | 10/1978 | Nakagome et al. | 358/260 |
| 4,134,133 | 1/1979 | Teramura et al. | 358/260 |

*Primary Examiner*—Robert L. Griffin
*Assistant Examiner*—Edward L. Coles
*Attorney, Agent, or Firm*—Robert E. Burns; Emmanuel J. Lobato; Bruce L. Adams

[57] ABSTRACT

A transmission method for a facsimile signal by the use of the two-dimensional coding principle, in which when successively coding addresses of a facsimile signal representative of the positions of information change picture elements, each having a binary value different from that of an immediately preceding picture element, the above-mentioned addresses on each coding scanning line are classified into three modes that are determined by the states of information change picture elements on the coding scanning line and on a reference scanning line immediately preceding the coding scanning line. The above two-dimensional coding principle and a one-dimensional coding principle may be adaptively adopted to shorten the transmission time and to lessen the influence of a transmission error.

12 Claims, 27 Drawing Figures

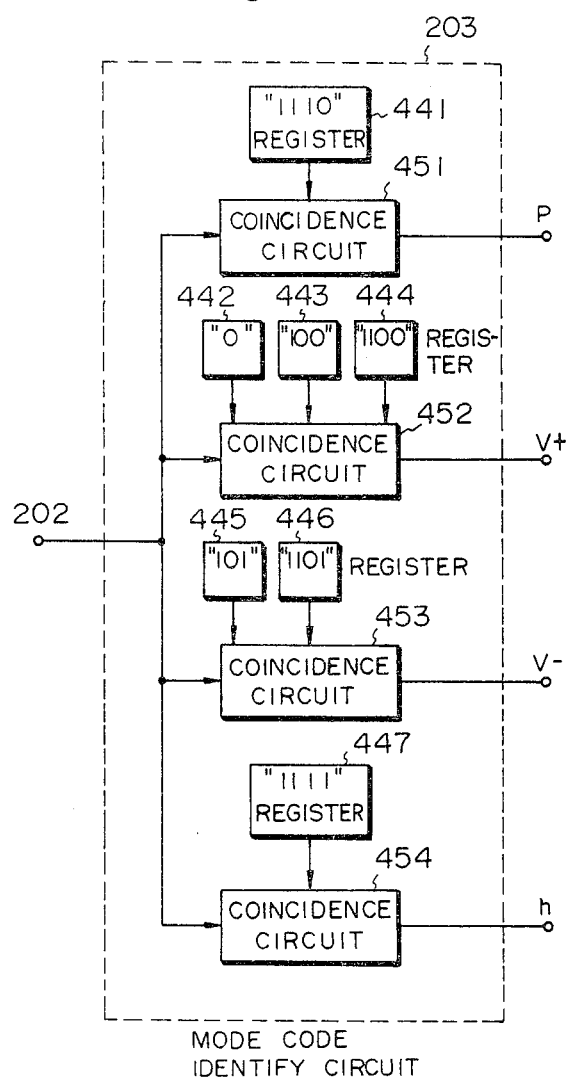

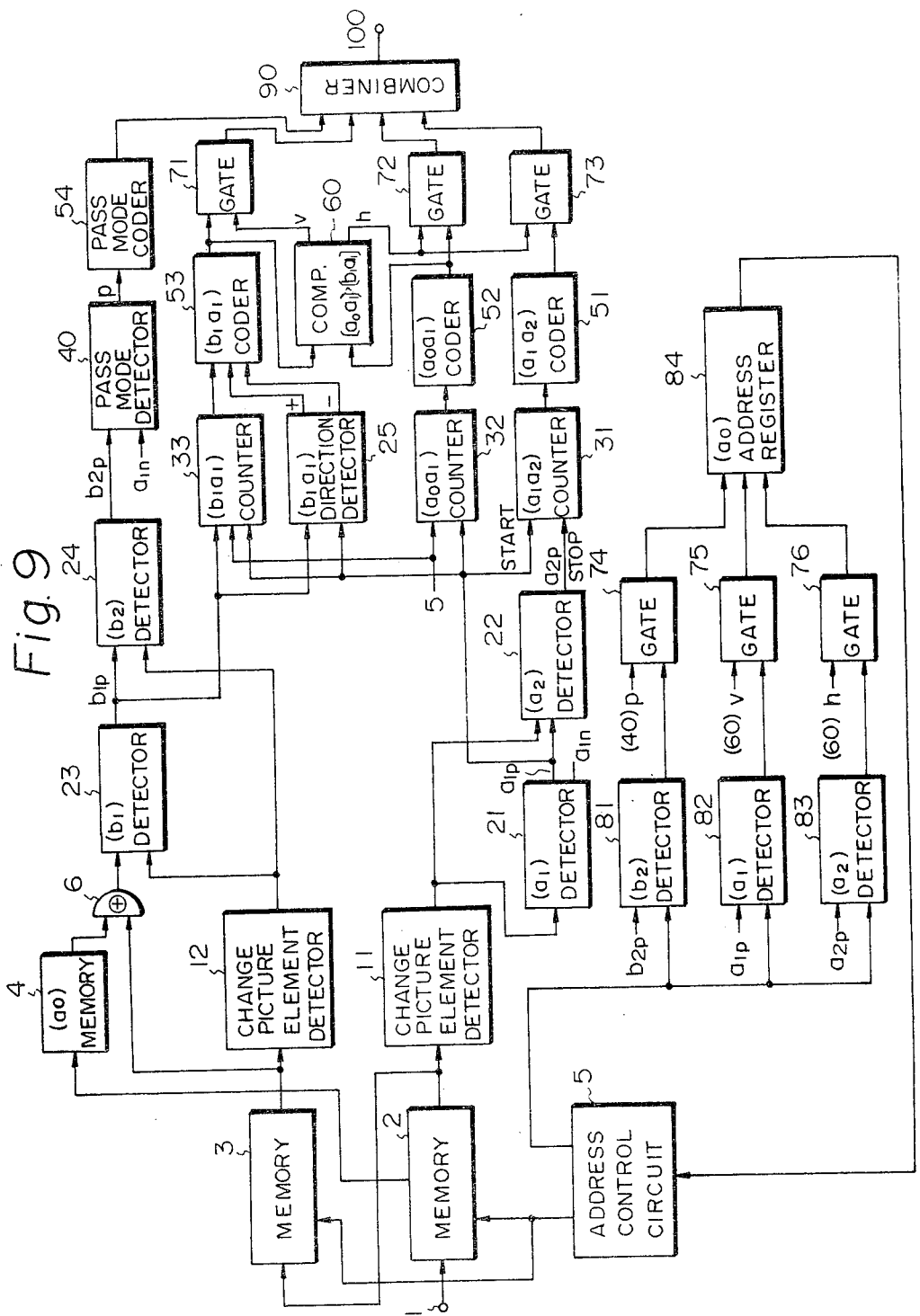

TRANSMISSION METHOD AND SYSTEM FOR FACSIMILE SIGNAL

BACKGROUND OF THE INVENTION

This invention relates to a transmission method for efficient transmission of a binary signal, such as a two level facsimile signal.

Heretofore, there have been proposed, as a two-level facsimile signal coding system, (1) a run-length coding system in which a signal obtained by scanning is converted into a time series train and then the magnitudes of the run lengths of white and black are successively coded alternately with each other for transmission and (2) a system in which signals of plural, for example, two scanning lines are simultaneously coded all together. The system (1) does not utilize at all the property that facsimile signals have a high correlation in a direction perpendicular (vertical) to the scanning line direction; therefore, the compression efficiency is low. The system (2) makes use of the correlation in the vertical direction with respect to the signals of a set of scanning lines to be coded at a time but does not utilize the correlation to signals of this system other scanning lines; consequently, the compression efficiency is higher than that of the system (1) but no sufficient compression effect is achieved, since this system does not fully use the two dimensional correlation among adjacent scanning lines.

SUMMARY OF THE INVENTION

An object of this invention is to overcome such defects of the prior art systems and to provide a transmission method using a two-dimensional successive coding system which removes redundancy of a facsimile signal by a relatively small number of memories and a simple circuit or means to thereby permit a substantial reduction of the number of bits to be sent out.

Another object of this invention is to provide a transmission method using a one-dimensional, two-dimensional adaptive coding method in which the two-dimensional successive coding principle and the one-dimensional coding principle, such as a run-length coding system, are adaptively adopted, so that the amount of information or signals to be transmitted is reduced, thereby to shorten the transmission time and to lessen the influence of a transmission error.

Another object of this invention is to provide a decoding system suitable for decoding a facsimile signal coded by the above mentioned coding method.

The present invention as to the first object is based on the principle that when successively coding information (hereinafter referred to as addresses) of a facsimile signal representative of the positions of informatin change picture elements (hereinafter referred to simply as change picture elements), each having a binary signal value different from that of an immediately preceding picture element, the number of picture elements (hereinafter referred to as the distance) between each change picture element to be coded and a selected one of the adjoining change picture elements on the same scanning line (hereinafter referred to as a coding line) as the change picture element to be coded or on a scanning line immediately preceding it (which scanning line will hereinafter be referred to as a reference line) is employed to be classified into three modes determined by the combinations of states of the above information change picture elements.

The present invention or to the second object is based on the principle that in the coding of a digital facsimile signal, picture signal information on each line is coded by the one-dimensional system (for example, a run-length coding system) and the two-dimensional system and, for each line, the two coded signals are compared with each other, for example, in the number of coded bits and a favorable one of them is selected as a coded output. Let [one-dimensional] and [two-dimensional] represent the numbers of coded bits obtained by coding a coding line by the one-dimensional and the two-dimensional coding system, respectively. When [one-dimensional]>[two-dimensional], the two-dimensional coding is used as a result of a judgement that the amount of information by the one-dimensional coding is larger than that by the two-dimensional coding, whereas when [one-dimensional]≦[two-dimensional], the one dimensional coding is employed for the line to be coded as a result of a judgement that the amount of information by the one-dimensional coding is smaller than that by the two-dimensional coding.

BRIEF DESCRIPTION OF THE DRAWINGS

This invention will be described in details hereinafter with reference to the accompanying drawings, in which:

FIGS. 5B, 5C and 5D show in block form specific operative examples of circuits for use in the decoding device of FIG. 5A;

FIG. 9 shows in block form another embodiment of this invention;

DESCRIPTION OF THE PREFERRED EMBODIMENTS

Figure 1:
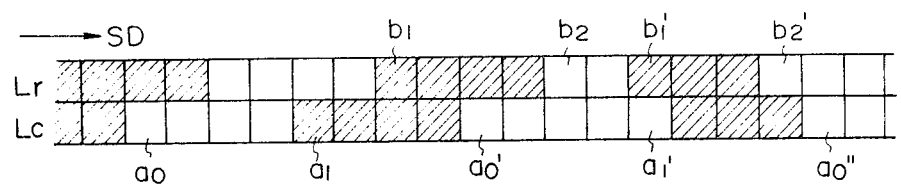
FIGS. 1, 2, 3A, 3B, 6, 7, 8A, 8B, 8C, 11 and 16 show examples of facsimile signals, explanatory of the principles of this invention.
Figure 2:
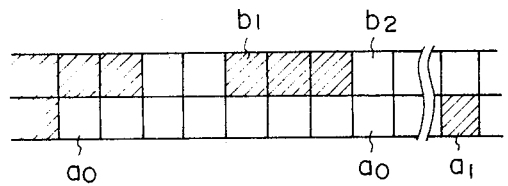

A detailed description will be given of specific operative examples of this invention.

FIGS. 1, 2, 3A and 3B illustrate examples of facsimile signals, blank blocks representing white picture elements and hatched blocks black picture elements.

At first, a coding start picture element $a_0$ and other change picture elements are defined as follows:

$a_0$: a starting picture element on the coding line Lc with which the coding starts along the scanning direction SD;

$a_1$: a change picture element next to $a_0$ on the coding line;

$b_1$: a first change picture element on the reference line Lr occurring after the picture element just above $a_0$ and having a binary signal value different from that of $a_0$; $b_2$: a change picture element next to $b_1$ on the reference line.

As will hereinbelow be described, the picture elements on the coding line and the refernce line are successively collated with each other to detect the change picture elements on the both scanning lines for coding.

(Procedure 1): In a case where the two change picture elements $b_1$ and $b_2$ on the reference line are detected prior to the change picture element $a_1$ on the coding line (refer to FIG. 2), this state is recognized as "a Pass mode" and the change picture elements $b_1$ and $b_2$ are coded with a Pass mode code, for example, "1110" ( refer to the column of the Pass mode in Table 1 ), by which a starting picture element for the next coding is set at a picture element $a'_0$ on the coding line just under the picture element $b_2$.

(Procedure 2): In a case where the change picture element $a_1$ is detected on the coding line prior to the change picture element $b_1$ on the reference line (refer to FIGS. 3A and 3B), scanning of the picture elements proceeds until the change picture element $b_1$ occurs and the number of coded bits $[a_0a_1]$ is obtained by adding the coded bits of a distance $a_0a_1$ to the bits of a Horizontal mode code "1111". At the same time, the number of coded bits $[b_1a_1]$ for coding a distance $b_1a_1$ as a Vertical mode is obtained (refer to Table 1).

TABLE 1

| Mode | Elements to be coded | Code |
|---|---|---|
| Pass mode | $b_1b_2$ | 1110 |
| Horizontal mode | $a_0a_1$ | 1111 + MH($a_0a_1$) |
| | $b_1a_1 = 0$ | 0 |
| | $b_1a_1 = +1$ | 100 |
| Vertical mode | $b_1a_1 = -1$ | 101 |
| | $b_1a_1 \geq 2$ | 1100 + D($b_1a_1 - 1$) |
| | $b_1a_1 \leq -2$ | 1101 + D($|b_1a_1| - 1$) |

| xy | MH (xy) xy : white | MH (xy) xy : black | n | D(n) |
|---|---|---|---|---|
| 0 | 00110101 | 0000110111 | 1 | 1 |
| 1 | 000111 | 010 | 2 | 01 |
| 2 | 0111 | 11 | 3 | 001 |
| 3 | 1000 | 10 | 4 | 0001 |
| 4 | 1011 | 011 | 5 | 00001 |
| : | : | : | : | : |

In the column of the "Vertical mode" in Table 1, "—" indicates the case of the picture element $a_1$ being detected before the picture element $b_1$ and "+" the case of the picture element $a_1$ being detected after the picture element $b_1$. These coded bit numbers are compared with each other to select any one of coding modes in accordance with the following conditions:

(a) $[a_0a_1] > [b_1a_1]$

In the case where this condition is established, it is judged that a high correlation exists between the change picture element $a_1$ to be coded and the reference picture element $b_1$ and the distance $b_1a_1$ is selected as the Vertical mode to shift a new starting picture element to the position of the picture element $a_1$.

Figure 3A:
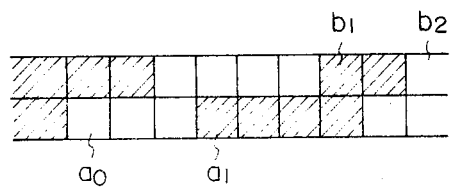

For example, in the case of FIG. 3A, $[b_1a_1] =$ "110101" $= 6$ bits and $[a_0a_1] =$ "11111000" $= 8$ bits; consequently, the condition $[a_0a_1] > [b_1a_1]$ is established. Then, the picture element $a_1$ is encoded by a Vertical mode so that the coded signal "110101" is generated.

(b) $[a_0a_1] \leq [b_1a_1]$

When this condition is set up, it is judged that a high correlation exists between the change picture element $a_1$ to be coded and the starting picture element $a_0$ and coding of the distance $a_0a_1$ is achieved following the Horizontal mode code "1111", shifting a new starting picture element to the position of the picture element $a_1$.

Figure 3B:
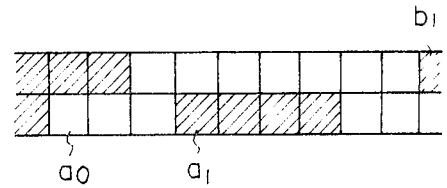

For example, in the case of FIG. 3B, $[b_1a_1] = -6 =$ "110100001" $= 9$ bits and $[a_0a_1] =$ "11111000" $= 8$ bits; consequently, the condition $[a_0a_1] \leq [b_1a_1]$ is established and the coded output of the picture element $a_1$ becomes "11111000".

In the above description, the expression (a) and (b) are mentioned as the conditions for selecting either the Horizontal mode or the Vertical mode but other conditional expressions can be used, such as follows:

(a): $[a_0a_1] > [b_1a_1] + m$ (m being an integer)
(b): $[a_0a_1] \leq [b_1a_1] + m$ (m being an integer)

Alternatively, if use is made of the distances $a_0a_1$ and $b_1a_1$ before coding, (a): $a_0a_1 > b_1a_1 + m$ (m being an integer)
(b): $a_0a_1 \leq b_1a_1 + m$ (m being an integer)

Moreover, in the column of codes in Table 1, a MH code (a modified Huffman code, for particulars, refer to CCITT Recommendations Ti 4) and a bit-by-bit code D(n) are used; but it is a matter of course that the present invention is not limited specifically to the use of such codes and can be achieved with ordinary variable length codes.

Besides, in the procedure 1, it is conditioned that the change picture elements just above the picture elements $a_0$ and $a_1$ are not regarded as $b_1$ and $b_2$; but the condition can be modified such that the change picture element just above the picture element $a_0$ or $a_1$ is included in $b_1$ and $b_2$, or that the change picture elements are not regarded as $b_1$ and $b_2$ unless they are not spaced more than n (n being 0 or a positive integer) picture elements apart from the picture elements $a_0$ and $a_1$.

As described in detail above, in the present invention, addresses of change picture elements to be coded are successively coded and, in this case, the addresses are each coded using a relative distance between the change picture element to be coded and selected one of the change picture elements already coded.

A brief description will be made of an example of boundary conditions which are utilized when this invention is reduced into practice, although it does not define the essence of the invention.

(1) Coding of a starting picture element on each scanning line;

A change picture element from white to black is always used as a first change picture element on each line to be coded.

Accordingly, in a case of the first picture element being black, it is made the first change picture element or the first picture element is compulsorily made white.

Further, the first starting picture element $a_0$ on each coding line is set up at the position of the first picture element.

(2) Coding of a terminating picture element on each scanning line:

The terminating picture element (in CCITT Recommendation T. 4, one line consists of 1728 picture elements) of each line is coded on the assumption that a change picture element lies next to it.

The following will describe examples of circuits for carrying this invention into practice in accordance with the principles described above.

Figure 4A:
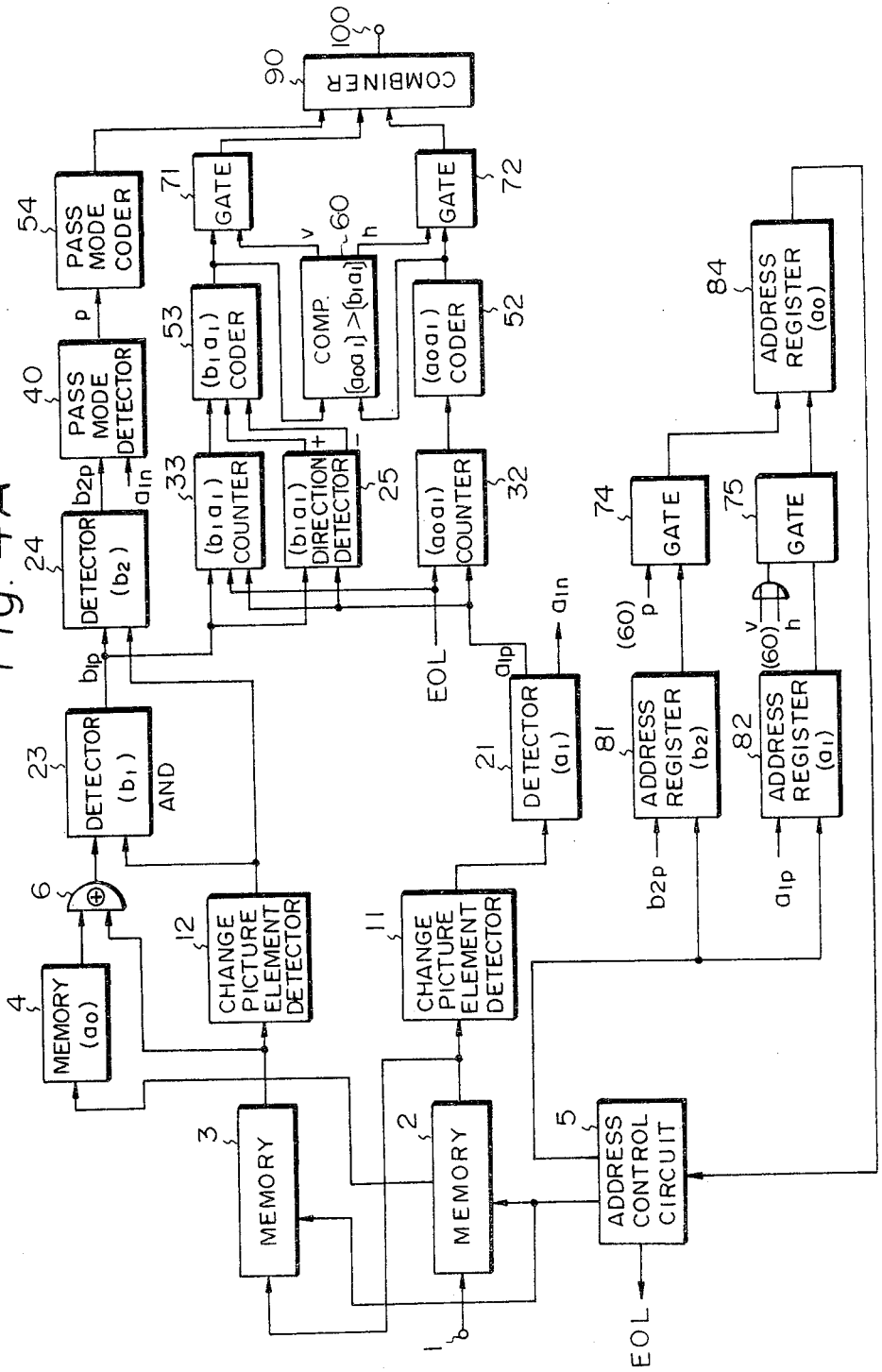
FIG. 4A illustrates in block form an embodiment of this invention.
Figure 4B:
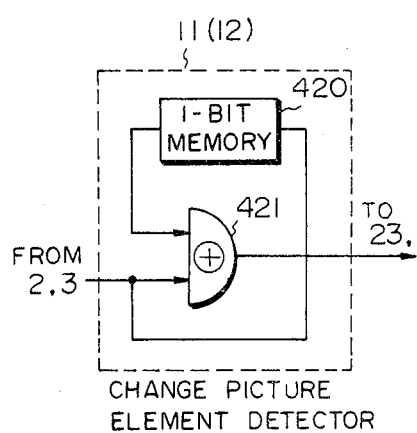
FIGS. 4B, 4C and 4D illustrate in block form specific operative examples of circuits for use in the embodiment of FIG. 4A.

FIG. 4A illustrates an example of a coding device. Reference numeral 1 indicates an input terminal for a sampled two-level facsimile signal; 2 and 3 designate line memories, each storing signals of one line; 4 identifies a memory for storing the level of starting picture element $a_0$; 5 denotes an address control circuit for controlling addresses of memories 2 and 3 and for generating an end of line signal EOL; 6 represents an exclusive OR circuit; 11 and 12 show change picture element detectors, each composed of a 1-bit memory 420 and an exclusive OR circuit 421, as shown in FIG. 4B; 21, 23 and 24 refer to detectors for detecting the change picture elements $a_1$, $b_1$ and $b_2$, respectively; 25 indicates a $b_1a_1$ direction detector; 32 and 33 designate counters; 40 identifies a pass mode detector; 52, 53 and 54 denote coders; 60 represents a comparator for comparing the numbers of coded bits with each other; 71, 72, 74 and 75 show gates; 81, 82 and 84 refer to address registers, each formed by a counter; 90 indicates a signal combiner; and 100 identifies an output terminal. For the sake of brevity, a memory shift pulse generator, a counter clock pulse generator, etc. are not shown; but these do not exert influence on an understanding of the essence of the operation of the present invention.

Figure 4C:
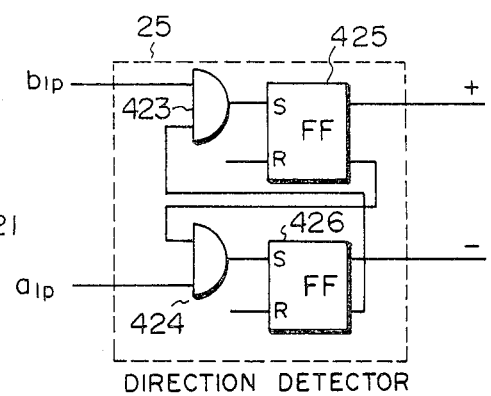
Figure 4D:
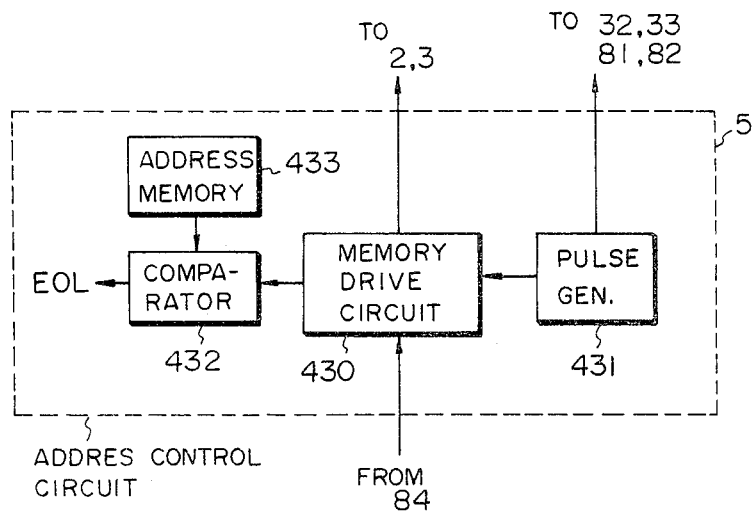

Next, the construction and operation of this embodiment will be described in detail. A facsimile signal to be coded is provided from the input terminal 1 to the coding line memory 2 for storage therein. Before this time, as a signal of a reference line, a signal of the preceding line stored in the line memory 2 is transferred to the reference line memory 3 for storage therein. The $a_0$ memory 4 has stored therein level of the starting picture element $a_0$, as will be described later on. Reading of the coding line memory 2 and the reference line memory 3 simultaneously starts from the position of the starting picture element $a_0$ under the control of the address control circuit 5. The change picture element detector 11 compares a picture element signal read out of the line memory 2 with an immediately preceding picture element signal, successively, and as a result it generates an output "0" or "1" in dependence on whether the former signal is of the same level as the latter signal or not. The change picture element detector 12 detects change picture elements on the line memory 3 successively by the same manner as the detector 11. The $b_1$ detector 23 is an AND circuit which provides "1" on an output line $b_{1p}$ when a change picture element is detected by the change picture element detector 12 and the detected change picture element level differs from that of the starting picture element $a_0$, that is, when the output from the exclusive OR circuit 6 is "1". The $b_2$ detector 24 provides "1" on an output line $b_{2p}$ in a case where a change picture element is detected by the change picture element detector 12 after detection of the change picture element $b_1$ by the $b_1$ detector 23; this $b_1$ detector 24 can be made up of one flip-flop and an AND circuit. This Pass mode detector 40 is an AND circuit which provides "1" on an output line p, judging that the mode of operation is the Pass mode in a case where the picture element $a_1$ has not been detected at the moment of occurrence of "1" on the output line $b_{2p}$ (in this case, $a_{1n}$ which is the output $\overline{Q}$ of a flip-flop in the $a_1$ detector 21 is "1"), as will be described later. With "1" on the output line p, the Pass mode coding circuit 54 yields a Pass mode code "1110", which is applied to the signal combiner 90. Following this, a new starting picture element $a_0$ is shifted to the position just below the picture element $b_2$ in the following manner: Upon occurrence of "1" on the line $b_{2p}$, the $b_2$ address register 81 stops counting of pulses from the address control circuit 5 and stores this status. This information is applied via the gate 74 to the $a_0$ address register 84 for addition to its content when the Pass mode detector 40 produces "1" on the line p. Besides, the $a_1$ address register 82 stops counting of pulses from the address control circuit 5 upon occurrence of "1" on the line $a_{1p}$ and this information is provided via the gate 75 to the $a_0$ address register 84 for addition to its content when the comparator 60 produces "1" on a line V or h. The contents of the $a_0$ address register 84 are applied to the address control circuit 5 to re-start the coding operation with the new starting picture element. The address control circuit 5 has such a construction as shown in FIG. 4D, which stores the contents of the $a_0$ address register 84 in a register of a memory drive circuit 430 and increases a memory read-out address one by one upon each occurrence of a pulse from a pulse generator 431 to read information of the line memories 2 and 3 simultaneously bit by bit from the $a_0$ address in the register of the memory drive circuit 430. Further, upon each reception of the contents of the $a_0$ address register 84, the address control circuit applies the new starting picture element level to the $a_0$ memory 4 via the coding line memory 2. The contents of the memory drive circuit 430 are compared in a comparator 432 with contents of an address memory 433 of the end picture element of one line to generate an end of line signal EOL.

The first change picture element detector 11, when detecting a change picture element, provides an output "1" to the $a_1$ detector 21, (a flip-flop). As a result of this, the information on the lines $a_{1p}$ and $a_{1n}$ change from "0" to "1" and from "1" to "0", respectively. The $a_0a_1$ counter 32 starts counting of pulses from the moment of setting $a_0$ in the address control circuit 5, and stops the counting upon reception of "1" from the line $a_{1p}$ and provides the count value to the $a_0a_1$ coding circuit 52. The $a_0a_1$ coding circuit 52 encodes the count value with "1111" added to its head, using a code table such as shown in the column of the Horizontal mode of Table 1. The $b_1a_1$ counter 33 receives the outputs from the lines $b_{1p}$ and $a_{1p}$ so that it starts pulse counting with a first appearing "1" in either one of the lines $b_{1p}$ and $a_{1p}$ and stops the counting with a next appearing "1" in the other. To the $b_1a_1$ direction detector 25 are also supplied the outputs from the lines $b_{1p}$ and $a_{1p}$ and, with the circuit construction shown in FIG. 4C, comprising the AND circuits 423 and 424 and two flip-flop circuits 425 and 426, this detector outputs "1" on a line + when "1" of the line $b_{1p}$ appears earlier than or simultaneously with "1" of the line $a_{1p}$ but, in the opposite case, provides an output "1" on a line − .

The $b_1a_1$ coding circuit 53 encodes $b_1a_1$ with a sign + or − added thereto on the basis of the count value of the $b_1a_1$ counter 33 and the output of the line + or − from the $b_1a_1$ direction detector 25, as shown in the column of the Vertical mode of Table 1. The bit numbers encoded by the coding circuits 52 and 53 are compared in magnitude with each other in the comparator 60; when the condition $[a_0a_1] > [b_1a_1]$ is established, "1"

is provided on the line V (the Vertical mode), whereas when this condition is not established, "1" is provided on the line h (Horizontal mode). In a case of the Vertical mode in which "1" is outputted on the line V of the comparator 60, the coded signal of the $b_1a_1$ coding circuit 53 is provided via the gate 71 to the signal combiner 90. On the other hand, in the Horizontal mode in which "1" is yielded on the line h, the gate 72 is opened to apply therethrough the coded signal of the $a_0a_1$ coding circuit 52 to the signal combiner 90. The signal combiner 90 combines the coded signals applied thereto from the Pass mode coding circuit 54 and the gates 71 and 72 into a composite signal, which is provided on the output line 100 after being converted into an output signal train.

For the sake of brevity, the conditions for resetting the detectors, registers, counters and so forth are neither described in the foregoing nor shown in the drawings; but, required ones of these circuits (the $b_2$ detector 24, the $a_1$ detector 21, the registers 81 and 82, the $b_1a_1$ direction detector 25, the counters 32 and 33 and so forth) are reset for each setting of the picture element $a_0$.

The interruption of the operation of this coding device is placed under the control of the address control circuit 5. Namely, the $a_0$ address is always watched by the address control circuit 5, the coding is stopped at the moment when the $a_0$ address becomes a line terminating picture element and the $a_0$ address is newly set to a line starting picture element and then coding of the subsequent line is resumed.

Figure 5A:
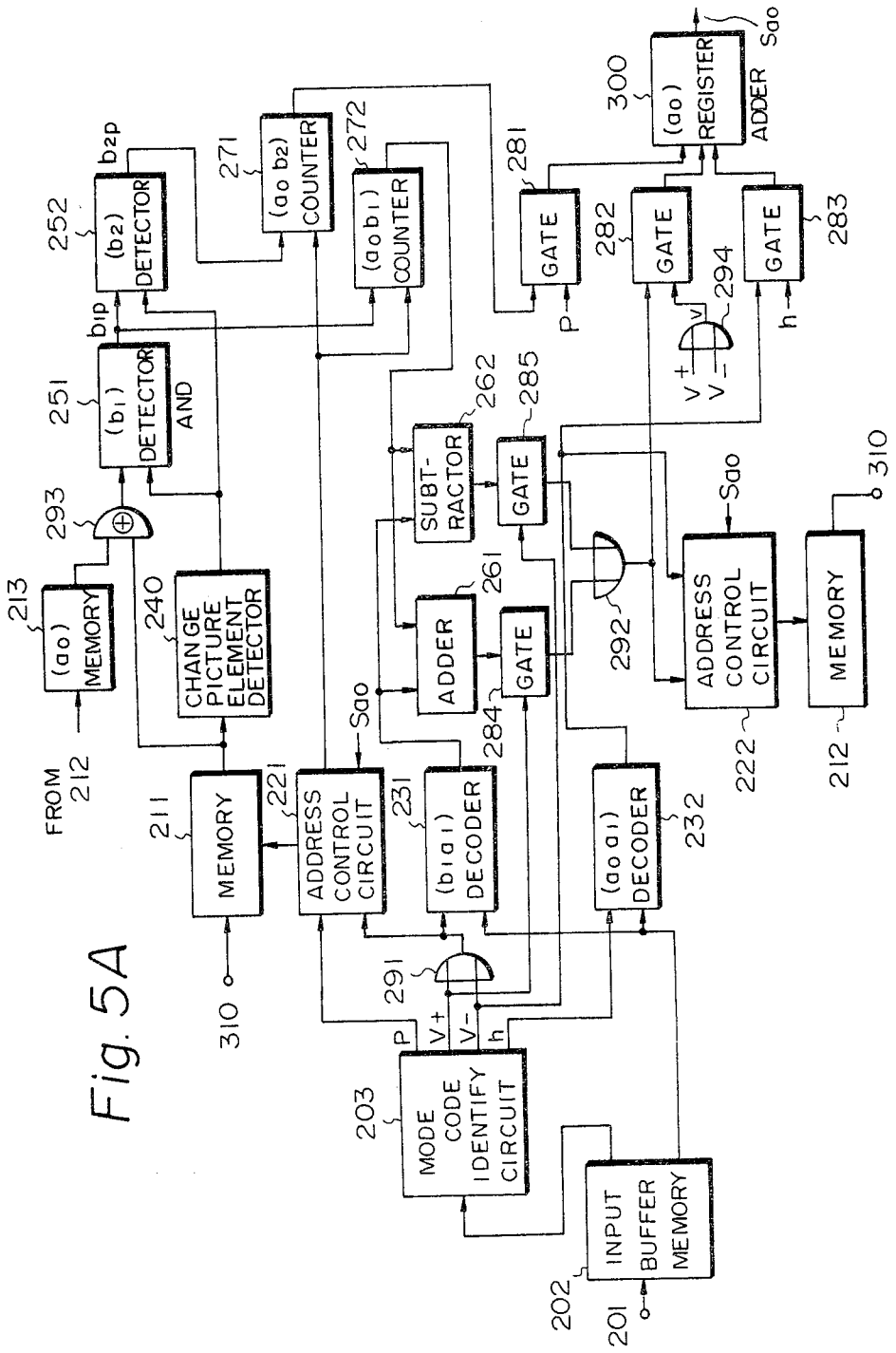
FIG. 5A shows in block form an example of a decoding device for a facsimile signal encoded by the embodiment of FIG. 4A.

The above is the operation of the coding device of FIG. 4A and decoding is achieved by reversing the abovesaid steps. An example of a decoding device is shown in FIG. 5A. Reference numeral 201 indicates an input terminal; 202 designates an input buffer memory; 203 identifies a mode code identify circuit; 211 and 212 denote line memories; 213 represents an $a_0$ memory; 221 and 222 show address control circuits; 231 and 232 refer to decoding circuits; 240 indicates a change picture element detector; 251 and 252 designate a $b_1$ detector and a $b_2$ detector, respectively; 261 and 262 identify an adder and a subtractor, respectively; 271 and 272 denote counters; 281 and 285 represent gates; 291, 292 and 294 show OR circuits; 293 refers to an exclusive OR circuit; 300 indicates an $a_0$ register; and 310 designates an output terminal.

Figure 5C:
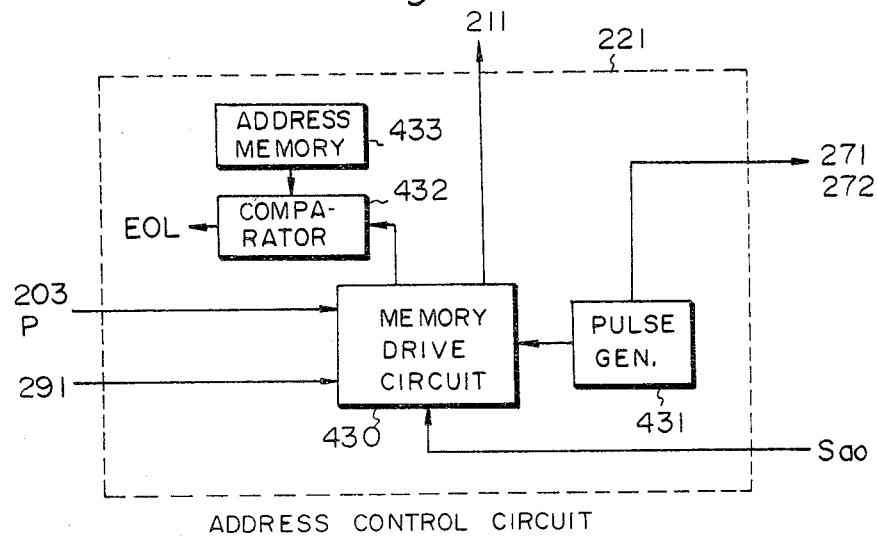

The following will describe the construction and the operation of the decoding device of FIG. 5A in detail. A coded signal from the input terminal 201 is once stored in the input buffer memory 202. The mode code identify circuit 203 has such a construction as shown in FIG. 5B, comprising resistors 441, 442, 443, 444, 445, 446 and 447 and coincidence circuits 451, 452, 453 and 454, in which a signal (four bits at most, as shown in Table 1) necessary for mode identification is read out of the input buffer memory 202 to identify the modes of operation, i.e. the Pass mode, the Horizontal mode and the Vertical mode. When the signal is "1110", it is regarded as indicating the Pass mode and "1" is outputted on a line p; when the signal is "1111", it is regarded as indicating the Horizontal mode and "1" is provided on a line h; when the signal is "0", "100" or "1100", it is regarded as indicating that the direction of the distance $b_1a_1$ is plus in the Vertical mode and "1" is produced on a line V+; and when the signal is "101" or "1101", it is regarded as indicating that the direction of the distance $b_1a_1$ is minus in the Vertical mode and "1" is yielded on a line V−. The address control circuit 221 has such a construction as depicted in FIG. 5C, in which when any one of the outputs p, V− and V+ from the mode code identify circuit is "1", pulses are applied to the memory 211 to shift it bit by bit from the $a_0$ address provided from $Sa_0$.

When the identify circuit 203 provides "1" on the line p (the Pass mode), the address control circuit 221 reads the reference line memory 211 from the address of the picture element $a_0$ to start detection of the distance $b_1b_2$. The reference line memory has stored therein information of the previous line via the coding line memory 212.

The change picture element detector 240 has the construction shown in FIG. 4B and provides an output "1" upon each detection of a picture element, whose level is different from the immediately preceding one in the signal train applied from the line memory 211. At the moment when the change picture element detector 240 provides the outoput "1", if the detected picture element is different in level from the picture element $a_0$, the output "1" is applied via the exclusive OR circuit 293 to the $b_1$ detector (an AND circuit) 251 to produce an output "1" on a line $b_{1p}$. The $a_0b_1$ counter 272 receives pulses from the address control circuit 221 and counts the number of pulses occurring in the time interval from the $a_0$ address to $b_1$ (until "1" is provided on the line $b_{1p}$). The $b_2$ detector 252 outputs "1" on a line $b_{2p}$ when another change picture element is detected by the change picture element detector 240 after detection of the picture element $b_1$. This $b_1$ detector comprises a flip-flop and an AND circuit. The $a_0b_2$ counter 271 receives pulses from the address control circuit 221 and counts them occurring in the time interval from the $a_0$ address to $b_2$ (until "1" is provided on the line $b_{2p}$). The contents of the $a_0b_2$ counter 271 are applied to the $a_0$ register 300 via the gate 281, which is opened by the provision of the output "1" on the line p of the mode code identify circuit 203. The contents of the $a_0$ register 300 are added to the address control circuits 221 and 222, so that the $a_0$ address is newly set and the decoding operation is resumed.

Figure 5D:
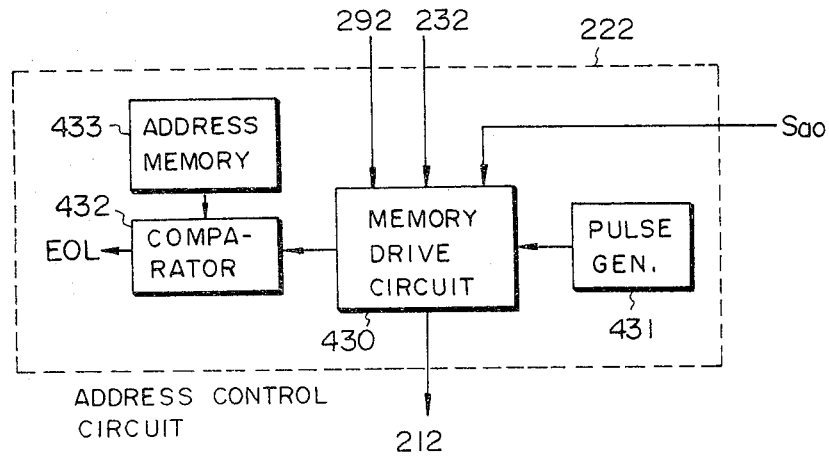

In a case where the identify circuit 203 provides "1" on the line V+ or V− (Vertical mode), the output "1" from the OR circuit 291 is applied to the address control circuit 221 and the $b_1a_1$ decoding circuit 231. As a consequence, decoding relating to the abovesaid $b_1$ takes place and the count value of the $a_0b_1$ counter 272 indicates the address of the picture element $b_1$ relative to the picture element $a_0$. The $b_1a_1$ decoding circuit 231 reads signals of one word from the input buffer memory 202 and decodes them. The decoded value is added by the adder 261 to the value of the $a_0b_1$ counter 272 and, at the same time, subtracted by the subtractor 262 from the value of the $a_0b_1$ counter 272. In a case where the output line V+ of the mode code identify circuit 203 is "1", the gate 284 is opened, so that the information of the adder 261 is provided via the OR circuit 292 to the address control circuit 222 and to the $a_0$ register 300 via the gate 282. In contrast thereto, if the output line V− of the mode code identify circuit 203 is "1", the gate 285 is opened, passing on the information of the subtractor 262 to the address control circuit 222 via the OR circuit 292 and to the $a_0$ register 300 via the gate 282. The address control circuit 222 has such a construction as depicted in FIG. 5D, which sets up the address of the picture element $a_0$ on the basis of the information transmitted thereto via the OR circuit 292, reproduces the picture element signals on the coding line as the same level as the picture element $a_0$ from the picture element $a_0$ to a picture element immediately preceding $a_1$, and inverts the level of the picture element $a_1$ relative to the information of the picture element $a_0$. The contents of the $a_0$ register 300 are applied to the address control circuits 221 and 222, newly setting the address of the picture element $a_0$ and resuming decoding.

In a case where the line h of the mode code identify circuit 203 becomes "1" (Horizontal mode), the $a_0a_1$ decoding circuit 232 reads signals of one word from the input buffer memory 202 and decodes them. The decoded value is added to the address control circuit 222 and the $a_0$ register 300 via the gate 283. The address control circuit 222 sets up the address of the picture element $a_1$, reproduces the picture element signal on the coding line as the same level as the picture element $a_0$ from the picture element $a_0$ to a picture element immediately preceding $a_1$, and makes the level of the picture element $a_1$ to be different from the level of the picture element $a_0$. The $a_0$ address register 300 restores the address of the picture element $a_1$, so that the $a_1$ address becomes a new $a_0$ address. This new address is provided to the address control circuits 221 and 222 to set the $a_0$ address and re-start decoding.

Also in respect of the above decoding device, the resetting conditions for the detectors, the registers, the counters and so forth have been neither described nor shown in the drawings; but the mode code identify circuit 203, the $b_2$ detector 252, the address control circuits 221 and 222, the counters 271 and 272, the decoding circuits 231 and 232, etc. are reset for each new setting of the $a_0$ address. The termination of one line is achieved by supervising the $a_0$ address with the address control circuit 222 and at the moment of the address of the picture element becoming the address of the last picture element of a scanning line, decoding of that line is completed and decoding of the next line is resumed.

In the above embodiment, when the Horizontal mode is identified, a distance between the starting picture element and the coding change point is encoded and the code "1111" indicating the Horizontal mode is added to the encoded value. For further enhancement of the compression efficiency, however, it is considered that in the case of the Horizontal mode being identified, the following change picture elements are encoded together and added with one Horizontal mode code "1111". That is, one Horizontal mode code is shared by two change picture elements; consequently, the compression efficiency is improved. This will hereinbelow be described in detail.

Figure 6:
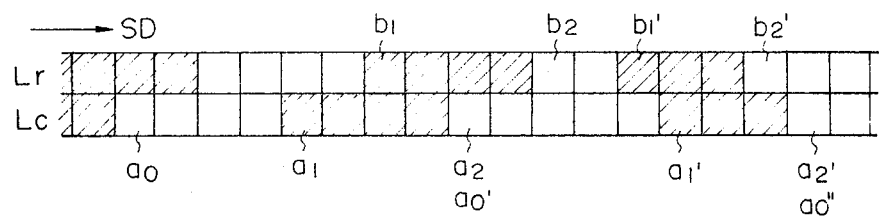

FIG. 6 illustrates examples of facsimile signals, blank blocks representing white picture elements and hatched blocks black picture elements. At first, a coding start picture element $a_0$ and other change picture elements are defined as follows:

$a_0$: a starting picture element on the coding line with which the coding starts;

$a_1$: a change picture element next to $a_0$ on the coding line;

$a_2$: a change picture element next to $a_1$ on the coding line;

$b_1$: a first change picture element on the reference line occurring after the picture element just above $a_0$ and having a binary signal value different from that of $a_0$;

$b_2$: a change picture element next to $b_1$ on the reference line.

As will hereinbelow be described, the picture elements on the coding line and the reference line are successively collated with each other to detect the change picture elements on the both scan lines for coding.

Figure 7:
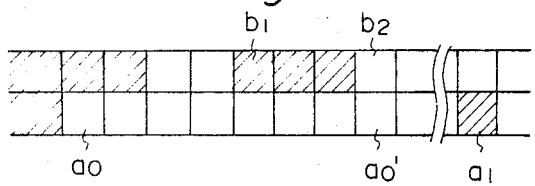

(Procedure 1): In a case where the two change picture elements $b_1$ and $b_2$ on the reference line are detected prior to the change picture element $a_1$ on the coding line (refer to FIG. 7), this state is recognized as a Pass mode and the change picture elements $b_1$ and $b_2$ are coded with a Pass mode code, for example, "1110" (refer to the column of the Pass mode in Table 2), by which a starting picture element for the next coding is set at a picture element $a'_0$ on the coding line just under the picture element $b_2$.

(Procedure 2): In a case where the change picture element $a_1$ is detected on the coding line prior to the change picture element $b_1$ on the reference line (refer to FIGS. 8A, 8B), scanning of the picture elements proceeds until the change picture element $b_1$ occurs and the number of coded bits $[a_0a_1]$ is obtained by adding the coded bits of a distance $a_0a_1$ to the bits of a Horizontal mode code "1111". At the same time, the number of coded bits $[b_1a_1]$ for coding a distance $b_1a_1$ as a Vertical mode is obtained (refer to Table 2).

TABLE 2

| Mode | Elements to be coded | Code |
|---|---|---|
| Pass mode | $b_1b_2$ | 1110 |
| Horizontal mode | $a_0a_1, a_1a_2$ | 1111 + MH($a_0a_1$) + MH($a_1a_2$) |
| | $b_1a_1 = 0$ | 0 |
| | $b_1a_1 = +1$ | 100 |
| Vertical mode | $b_1a_1 = -1$ | 101 |
| | $b_1a_1 \geq 2$ | 1100 + D($b_1a_1 - 1$) |
| | $b_1a_1 \leq -1$ | 1101 + D($|b_1a_1| - 1$) |

| xy | MH(xy) xy: white | MH(xy) xy: black | n | D(n) |
|---|---|---|---|---|
| 0 | 0011110101 | 0000110111 | 1 | 1 |
| 1 | 000111 | 010 | 2 | 01 |
| 2 | 0111 | 11 | 3 | 001 |
| 3 | 1000 | 10 | 4 | 0001 |
| 4 | 1011 | 011 | 5 | 00001 |
| : | : | : | : | : |

The signs "−" and "+" are the same as in Table 1. These coded bit numbers are compared to select any one of coding modes in accordance with the following conditions:

(a) $[a_0a_1] > [b_1a_1]$

When this condition is established, it is judged that a high correlation exists between the change picture element $a_1$ to be coded and the reference picture element $b_1$, and the value of the distance $b_1a_1$ coded in the Vertical mode is selected to shift a new starting picture element to the position of the picture element $a_1$.

Figures 8A, 8B:
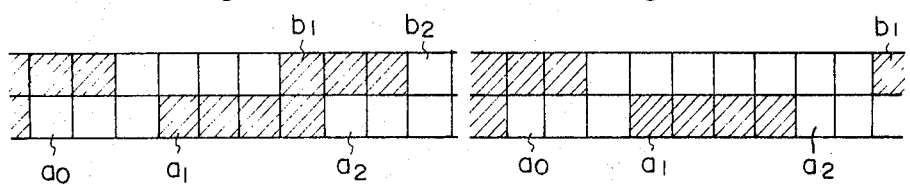

For example, in the case of FIG. 8A, $[b_1a_1]$="110101"=6 bits and $[a_0a_1]$="11111000"=8 bits; consequently, the condition $[a_0a_1] > [b_1a_1]$ is established. Then the picture element $a_1$ is encoded by a Vertical mode so that the coded signal "110101" is generated.

(b) $[a_0a_1] \leq [b_1a_1]$

When this condition is set up, it is judged that a high correlation exists between the change picture element $a_1$ to be coded and the starting picture element $a_0$, and it is decided to perform coding in the Horizontal mode until a change picture element $a_2$ appears after $a_1$; thus, collation proceeds until the change picture element $a_2$ occurs and code generation of the distances $a_0a_1$ and $a_1a_2$ is achieved following the generation of Horizontal mode code, for example, "1111", thereby shifting a new starting picture element to the position of the picture element $a_2$.

For example, in the case of FIG. 8B, $[b_1a_1]=6-$"110100001"$=9$ 'bits and $[a_0a_1]=$"11111000"$=8$ bits; consequently, the condition $[a_0a_1] \leq [b_1a_1]$ is established and the coded outputs of the picture elements $a_1$ and $a_2$ become "11111000" and "011".

In the above description, the expressions (a) and (b) are mentioned as the conditions for selecting either the Horizontal mode or the Vertical mode but other conditional expressions can be used, such as follows:

(a): $[a_0a_1] > [b_1a_1] + m$ (m being an integer)

(b): $[a_0a_1] \leq [b_1a_1] + m$ (m being an integer)

Alternatively, if use is made of the distances $a_0a_1$ and $b_1a_1$ before coding, (a): $a_0a_1 > b_1a_1 + m$ (m being an integer)

(b): $a_0a_1 > b_1a_1 + m$ (m being an integer)

Moreover, in the column of codes in Table 2, a MH code (a modified Huffman code, for particulars, refer to CCITT Recommendation T.4) and a bit-by-bit code D(n) are used; but it is a matter of course that the present invention is not limited specifically to the use of such codes and can be achieved with ordinary variable length codes.

Besides, in the procedure 1, it is conditioned that the change picture elements just above the picture elements $a_0$ and $a_1$ are not regarded as $b_1$ and $b_2$; but the condition can be modified such that the change picture element just above the picture element $a_0$ or $a_1$ is included in $b_1$ and $b_2$, or that the change picture elements are not regarded as $b_1$ and $b_2$ unless they are not spaced more than n (n being 0 or a positive integer) picture elements apart from the picture elements $a_0$ and $a_1$.

As described in detail above, in the present invention, addresses of change picture elements to be coded are successively coded and, in this case, the addresses are each coded using a relative distance between the change picture element to be coded and a selected one of the change picture elements already coded. Where this selected change picture element is the starting picture element $a_0$ on the coding line, the address of the next change picture element $a_2$ to be coded is also coded using the relative distance between it and the picture element $a_0$. As a consequence, the change picture elements whose addresses are coded using the distances between them and the starting picture elements on the coding line, are always in pairs. In a case of using the relative distance between change picture elements to be coded and a change picture element on the immediately preceding reference line, the change picture elements on the coding line are coded individually.

A brief description will be made of an example of boundary conditions which are utilized when this invention is reduced into practice, although it does not define the essence of the invention.

(1) Coding of a starting picture element on each scanning line:

A change picture element from white to black is always used as a first change picture element on each line to be coded. Accordingly, in a case of the first picture element being black, it is made the first change picture element or the first picture element is compulsorily made white.

Further, the first starting picture element $a_0$ on each coding line is set up at the position of the first picture element.

(2) Coding of a terminating picture element on each scanning line:

The terminating picture element (In CCITT Recommendation T.4. one line consists of 1728 picture elements; accordingly, the terminating picture element is the 1728th picture element.) of each line is coded on the assumption that a change picture element lies next to it.

The following will describe examples of circuits for carrying this invention into practice in accordance with the principles described above.

FIG. 9 illustrates an example of a coding device. Reference numeral 1 indicates an input terminal for a sampled two-level facsimile signal; 2 and 3 designate line memories, each storing signals of one line; 4 identifies a memory for storing the level of starting picture element $a_0$; 5 denotes an address control circuit for controlling addresses of memories 2 and 3; 6 represents an exclusive OR circuit; 11 and 12 show change picture element detectors, each composed of a 1-bit memory and an exclusive OR circuit, as shown in FIG. 4B; 21, 22, 23 and 24 refer to detectors for detecting the change picture elements $a_1$, $a_2$, $b_1$ and $b_2$, respectively; 25 indicates a $b_1a_1$ direction detector; 31, 32 and 33 designate counters; 40 identifies a Pass mode detector; 51, 52, 53 and 54 denote coders; 60 represents a comparator for comparing the numbers of coded bits with each other; 71, 72, 73, 74, 75 and 76 show gates; 81, 82, 83 and 84 refer to address registers; 90 indicates a signal combiner; and 100 identifies an output terminal. For the sake of brevity, a memory shift pulse generator, a counter clock pulse generator, etc. are not shown; but these do not exert influence on an understanding of the essence of the operation of the present invention.

Next, the construction and operation of this embodiment will be described in detail. A facsimile signal to be coded is provided from the input terminal 1 to the coding line memory 2 for storage therein. Before this time, as a signal of a reference line, a signal of the preceding line stored in the line memory 2 is transferred to the reference line memory 3 for storage therein. The $a_0$ memory 4 has stored therein level of the starting picture element $a_0$, as will be described later on. Reading of the coding line memory 2 and the reference line memory 3 simultaneously starts from the position of the starting picture element $a_0$ under the control of the address control circuit 5. The change picture element detectors 11 and 12 each comprise an exclusive OR circuit and a 1-bit memory, as shown in FIG. 4B, and compare the picture element signals read out of the each line memories 2 and 3 with immediately preceding picture element signals to output "0" or "1" in dependence on whether the former signals are of the same level as the latter signals or not, respectively. The $b_1$ detector 23 is an AND circuit which provides "1" on an output line $b_{1p}$ when a change picture element is detected by the second change picture element detector 12 and the detected change picture element level differs from that of the starting picture element $a_0$, that is, when the output from the exclusive OR circuit 6 is "1". The $b_2$ detector 24 provides "1" on an output line $b_{2p}$ in a case where a change picture element is detected by the change picture element detector 12 after detection of the change picture element $b_1$ by the $b_1$ detector 23; this $b_2$ detector 24 can be made up of one flip-flop and an AND circuit. The Pass mode detector 40 is an AND circuit which provides "1" on an output line p, judging that the mode of operation is the Pass mode in a case where the picture element $a_1$ has not been detected at the moment of occurrence of "1" on the output line $b_{2p}$ (in this case, $a_{1n}$ which is the output $\overline{Q}$ of a flip-flop in the $a_1$ detector 21 is "1"), as will be described later. With "1" on the output line p, the Pass mode coding circuit 54 yields a Pass mode code "1110", which is applied to the signal combiner 90. Following this, a new starting picture element ($a_0$) is shifted to the position just under the picture element $b_2$ in the following manner: Upon occurrence of "1" on the line $b_{1p}$, the $b_2$ address register 81 stops counting of pulses from the address control circuit 5 and stores the count value. These contents are applied via the gate 74 to the $a_0$ address register 84 when the Pass mode detector 40 produces "1" on the line p. The contents of the $a_0$ address register 84 are applied to the address control circuit 5 to re-start the coding operation with the new starting picture element.

The first change picture element detector 11, when detecting a change picture element, provides an output "1" to the $a_1$ detector 21 (a flip-flop). As a result of this, the information on the lines $a_{1p}$ and $a_{1n}$ change from "0" to "1" and from "1" to "0", respectively. The $a_2$ detector 22 is a flip-flop which produces "1" on a line $a_{2p}$ when a change picture element is detected by the change picture element detector 11 after the picture element $a_1$ is detected by the $a_1$ detector 21 ("1" on the line $a_{1p}$). The $a_0 a_1$ counter 32 starts counting of pulses from the moment of setting $a_0$ in the address control circuit 5, and stops the counting upon reception of "1" from the line $a_{1p}$ and provides the count value to the $a_0 a_1$ coding circuit 52. The $a_0 a_1$ coding circuit encodes the count value with "1111" added to its head, using, for example, such a code table as shown in the column of the Horizontal mode of Table 1. The $a_1 a_2$ counter 31 starts counting with "1" on the line $a_{1p}$ and stops the counting with "1" on the line $a_{2p}$ and provides the count value to the $a_1 a_2$ coding circuit 51. The $a_1 a_2$ coding circuit 51 encodes the count value using such a code table, for example, as shown in the column MH(xy) of Table 2. The $b_1 a_1$ counter 33 receives the outputs from the lines $b_{1p}$ and $a_{1p}$ so that it starts pulse counting with a first appearing "1" in either one of the outputs $b_{1p}$ and $a_{1p}$ and stops the counting with a next appearing "1" in the other. To the $b_1 a_1$ direction detector 25 are also applied the outputs from the lines $b_{1p}$ and $a_{1p}$ and, with the circuit construction shown in FIG. 4C, this detector outputs "1" on a line + when "1" of the line $b_{1p}$ appears earlier than or simultaneously with "1" of the line $a_{1p}$ but, in the opposite case, provides an output "1" on a line −.

The $b_1 a_1$ coding circuit 53 encodes $b_1 a_1$ with a sign + or − added thereto on the basis of the count value of the $b_1 a_1$ counter 33 and the output of the line + or − from the $b_1 a_1$ direction detector 25, as shown in the column of the Vertical mode of Table 1. The bit numbers encoded by the coding circuits 52 and 53 are compared in magnitude with each other in the comparator 60; when the condition $[a_0 a_1] > [b_1 a_1]$ is established "1" is provided on the line V (Vertical mode), whereas when this condition is not established, "1" is provided on the line h (Horizontal mode). In a case of the Vertical mode in which "1" is outputted on the line V of the comparator 60, the coded signal of the $b_1 a_1$ coding circuit 53 is provided via the gate 71 to the signal combiner 90. On the other hand, in the Horizontal mode in which "1" is yielded on the line h, the gates 72 and 73 are opened to apply therethrough the coded signals of the $a_0 a_1$ coding circuit 52 and the $a_1 a_2$ coding circuit 51 to the signal combiner 90. The signal combiner 90 combines the coded signals applied thereto from the Pass mode coding circuit 54 and the gates 71, 72 and 73 into a composite signal, which is provided on the output line 100 after being converted into an output signal train.

For the sake of brevity, the conditions for resetting the detectors, registers, counters and so forth are neither described in the foregoing nor shown in the drawings; but, required ones of these circuits (the $b_2$ detector 24, the $a_1$ detector 21, the $a_2$ detector 22, the registers 81, 82 and 83, the $b_1 a_1$ direction detector 25, the counters 31, 32 and 33 and so forth) are reset for each setting of the picture element $a_0$.

The interruption of the operation of this coding device is placed under the control of the address control circuit. Namely, the $a_0$ address is always watched by the address control circuit 5, the coding is stopped at the moment when the $a_0$ address becomes a line terminating picture element and the $a_0$ address is newly set to a line starting picture element and then coding of the subsequent line is resumed.

Figure 10A:
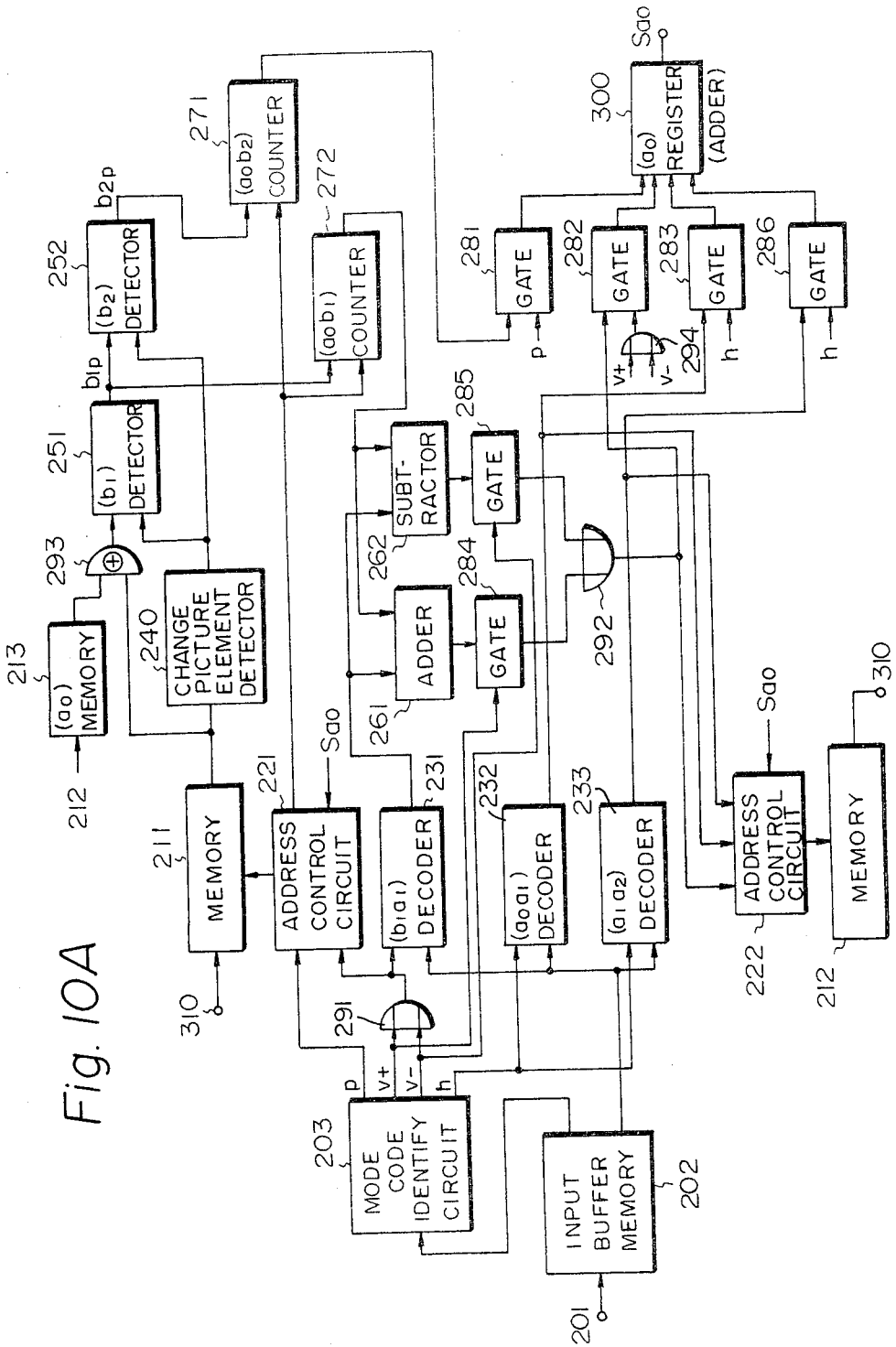
FIG. 10A illustrates in block form an example of a decoding device for a facsimile signal encoded by the embodiment of FIG. 9.

The above is the operation of the coding device of FIg. 9 and decoding is achieved by reversing the above-said steps. An example of a decoding device is shown in FIg. 10A. Reference numeral 201 indicates an input terminal; 202 designates an input buffer memory; 203 identifies a mode code identify circuit; 211 and 212 denote line memories; 213 represents an $a_0$ memory; 221 and 222 show address control circuits; 231, 232 and 233 refer to decoding circuits; 240 indicates a change picture element detector; 251 and 252 designate a $b_1$ detector and a $b_2$ detector, respectively; 261 and 262 identify an adder and a subtractor, respectively; 271 and 272 denote counters; 281, 282, 283, 284, 285 and 286 represent gates; 291, 292 and 294 show OR circuits; 293 refers to an exclusive OR circuit; 300 indicates an $a_0$ register; and 310 designates an output terminal.

The following will describe the construction and the operation of the decoding circuit of FIg. 10A in detail. A coded signal from the input terminal 201 is once stored in the input buffer memory 202. The mode code identify circuit 203 has such a construction as shown in FIG. 5B, in which a signal (for example, four bits at most, as shown in Table 2) necessary for mode identification is read out of the input buffer memory 202 to identify the modes of operation, i.e. the Pass mode, the Horizontal mode and the Vertical mode. When the signal is "1110", it is regarded as indicating the Pass mode and "1" is outputted on a line p; when the signal is "1111", it is regarded as indicating the Horizontal mode "1" and is provided on a line h; when the signal is "0", "100" or "1100", it is regarded as indicating that the direction of the distance $b_1 a_1$ is plus in the Vertical mode and "1" is produced on a line V+; and when the signal is "101" or "1101", it is regarded as indicating that the direction of the distance $b_1 a_1$ is minus in the Vertical mode and "1" is yielded on a line V−. The address control circuit 221 has such a construction as depicted in FIG. 5C, in which when any one of the outputs p, V− and V+ from the mode code identify circuit is "1", pulses are applied to the memory 211 to shift it bit by bit from the $a_0$ address provided from $Sa_0$.

When the identify circuit 203 provides "1" on the line p (the Pass mode), the address control circuit 221 shifts the reference line memory 211 from the address of the picture element $a_0$ to start detection of the distance $b_1 b_2$.

The reference line memory has stored therein information of the previous line memory has stored therein information of the previous line via the decoding line memory 212. The change picture element detector 240 has the construction shown in FIG. 4B and provides an output "1" upon each detection of a picture element different from the immediately preceding one in the signal train applied from the line memory 211. At the moment when the change picture element detector 240 provides the output "1", if the detected picture element is different in level from the picture element $a_0$, the output "1" is applied via the exclusive OR circuit 293 to the $b_1$ detector (an AND circuit) 251 to produce an output "1" on a line $b_{1p}$. The $a_0b_1$ counter 272 receives pulses from the address control circuit 221 and counts the number of pulses occurring in the time interval from the $a_0$ address to $b_1$ (until "1" is provided on the line $b_{1p}$). The $b_2$ detector 252 outputs "1" on a line $b_{2p}$ when another change picture element is detected by the change picture element detector 240 after detection of the picture element $b_1$ ("1" on the line $b_{1p}$). This $b_1$ detector comprises a flip-flop and an AND circuit. The $a_0b_2$ counter 271 receives pulses from the address control circuit 221 and counts them occurring in the time interval from the $a_0$ address to $b_2$ (until "1" is provided on the line $b_{2p}$). Upon occurrence of "1" on the line $b_{2p}$, the address control circuit 221 once stops sending out of shift pulses. The information of the $a_0b_2$ counter 271 is applied to the $a_0$ register 300 via the gate 281, which is opened by the provision of the output "1" on the line p of the mode code identify circuit 203. The information of the $a_0$ register 300 is added to the address control circuits 221 and 222, so that the $a_0$ address is newly set and the decoding operation is resumed.

In a case where the identify circuit 203 provides "1" on the line V+ or V− (the Vertical mode), the output "1" from the OR circuit 291 is applied to the address control circuit 221 and the $b_1a_1$ decoding circuit 231. As a consequence, decoding relating to the abovesaid $b_1$ and $b_2$ takes place and the count value of the $a_0b_1$ counter indicates the address of the picture element $b_1$ relative to the picture element $a_0$. The $b_1a_1$ decoding circuit 231 reads signals of one word from the input buffer memory 202 and decodes them. The decoded value is added by the adder 261 to the value of the $a_0b_1$ counter 272 and, at the same time, subtracted by the subtractor 262 from the value of the $a_0b_1$ counter 272. In a case where the output line V+ of the mode code identify circuit 203 is "1", the gate 284 is opened, so that the contents of the adder 261 are provided via the OR circuit 292 to the address control circuit 222 and to the $a_0$ register 300 via the gate 282. In contract thereto, if the output line V− of the mode code identify circuit 203 is "1", the gate 285 is opened, passing the contents of the subtractor 262 to the address control circuit 222 via the Or circuit 292 and to the $a_0$ register 300 via the gate 282.

Figure 10B:
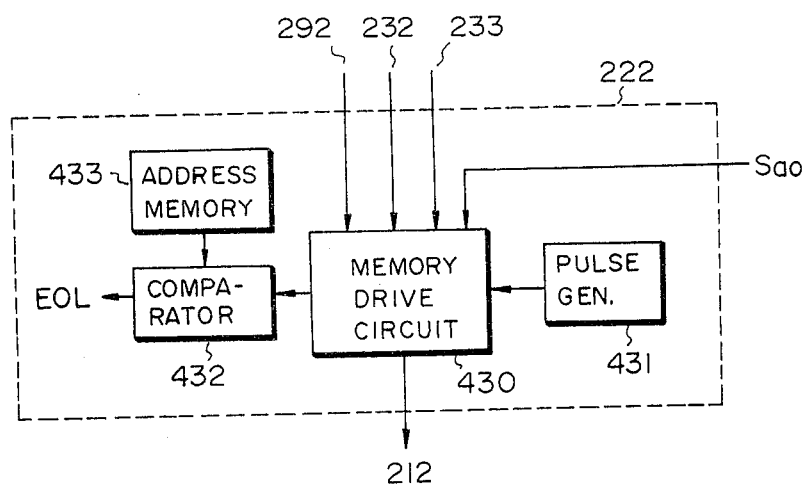
FIG. 10B illustrates in block form a specific operative example of a circuit for use in the decoding device of FIG. 10A.

The address control circuit 222 has such a construction as depicted in FIG. 10B, which sets up the address of the picture element $a_1$ on the basis of the information transmitted thereto via the OR circuit 292, reproduces picture element signals on the decoding line memory 212 from the picture element $a_0$ to a picture element immediately preceding $a_1$ to be the same level as the picture element $a_0$ and inverts the level of the picture element $a_1$ relative to the level of the picture element $a_0$. The contents of the $a_0$ register 300 are applied to the address control circuits 221 and 222, newly setting the address of the picture element $a_0$ and resuming decoding.

In a case where the line h of the mode code identify circuit 203 becomes "1" (the Horizontal mode), the $a_0a_1$ and $a_1a_2$ decoding circuits 232 and 233 successively read signals of two words from the input buffer memory 202 and the $a_0a_1$ decoding circuit 232 decodes the first one word and the $a_1a_2$ decoding circuit 233 the second one word. The decoded values are added to the address control circuit 222 and the $a_0$ register 300 via the gates 283 and 286. The address control circuit 222 sets up the addresses of the picture elements $a_1$ and $a_0$, reproduces picture element signals on the decoding line memory 212 from the picture element $a_0$ to a picture element immediately preceding $a_1$ to be the same as the level of the picture element $a_0$ and inverts the level of the picture element $a_1$ and, thereafter, reproduces picture element signals from the picture element $a_1$ to a picture element immediately preceding $a_2$ to be the same as the level of the picture element $a_1$ and makes the information of the picture element $a_2$ to be different from the level of the picture element $a_1$. The $a_0$ address register 300 restores the address of the picture elements $a_1$ and $a_2$, so that the $a_2$ address becomes a new $a_0$ address. This new information is provided to the address control circuits 221 and 222 to set the $a_0$ address and restart decoding.

Also in respect of the above decoding device, the resetting conditions for the detectors, the registers, the counters and so forth have been neither described nor shown in the drawings; but required ones of them (the mode code identify circuit 203, the $b_2$ detector 252, the address control circuits 221 and 222, the counters 271 and 272, the decoding circuit 231, 232 and 233, etc.) are reset for each setting of the $a_0$ address. The termination of one line is achieved by supervising the $a_0$ address with the address control circuit 222 and at the moment of the address of the picture element $a_0$ becoming the address of the last picture element of a scanning line, decoding of that line is completed and decoding of the next line is resumed.

Next, a description will be given of a system of suppressing degradation of the picture quality of the reproduced picture due to a code error which is another object of this invention. In the coding system of this invention, a picture signal of the coding line is encoded using picture signal information of a reference line immediately preceding the coding line. Accordingly, on the side of the decoder, the picture signal of the coding line is also decoded using the picture signal information already decoded. Thus, since coding and decoding are performed successively using the picture signal information of scanning lines immediately preceding the coding lines respectively, if a code error occurs due to the influence of circuit noises and the like to cause incorrect reproduction of picture signals of a certain line, picture signals of the succeeding lines are not reproduced correctly, resulting in markedly degraded picture quality of the reproduced picture.

Accordingly, it is necessary to detect occurrence of a code error, to suppress degradation of the picture quality of the line, in which the code error has occured and to rapidly recover from the code error state, so that the deterioration of the picture quality due to the code error do not spread to other lines.

Figure 11:
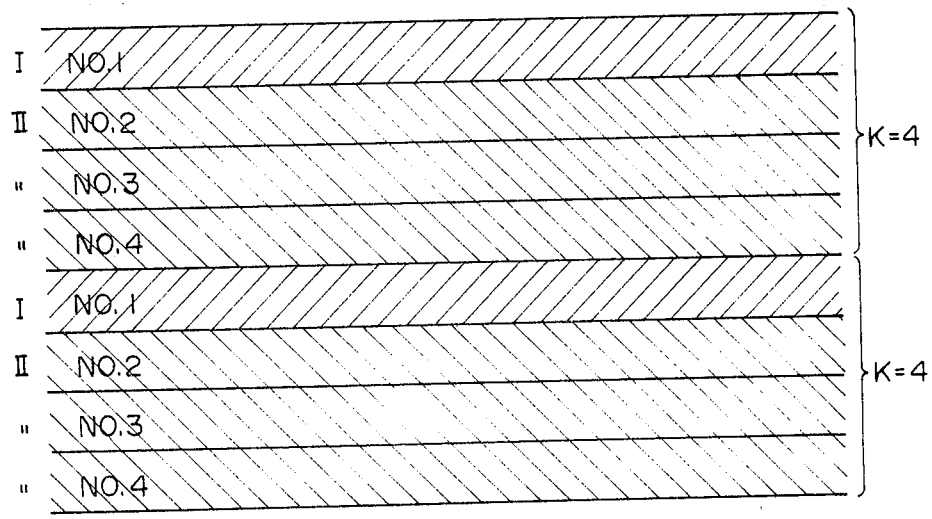

According to this invention, these objects are achieved in the following manner: On the side of the coding device, a detectable, so-called self-synchronized first control code is inserted, from a desired position in a code train, at a predetermined period of a picture signal, for example, immediately before the starting of coding of a line No. 1 every four lines (K=4) as shown in FIG. 11; picture signal information of the line No. 1 is encoded (into, for instance, a run-length code RL) by a one-dimensional method I without using picture signal information of a line immediately preceding the line No. 1; scanning lines No. 2, No. 3, ... No. K immediately following the line No. 1 are subjected to the two-dimensional successive coding II of this invention; and a second control code, different from the first control code for detecting the occurrence of a code error is inserted just before the coded signal of each line.

On the side of the decoding device, when the self-synchronized first control code is detected, it is decoded as the line No. 1 without using information of the immediately preceding line on the assumption that the directly following code train has been encoded into a run-length code, RL. When the second control code is detected, it is decoded using information of the immediately preceding line on the assumption that it has been encoded according to this invention. Directly after completion of decoding of each line, the presence or absence of the first or second control code is checked to effect error checking. When an error is detected, the decoded line, in which the error is detected, is subjected to processing such as replacement by a picture signal of the immediately preceding line to thereby suppress deterioration of the picture quality. Upon detection of the error, the decoding operation is once stopped; but when the self-synchronized first control code is detected, decoding of the run-length code RL is immediately started to restore from the error state.

Figure 12:
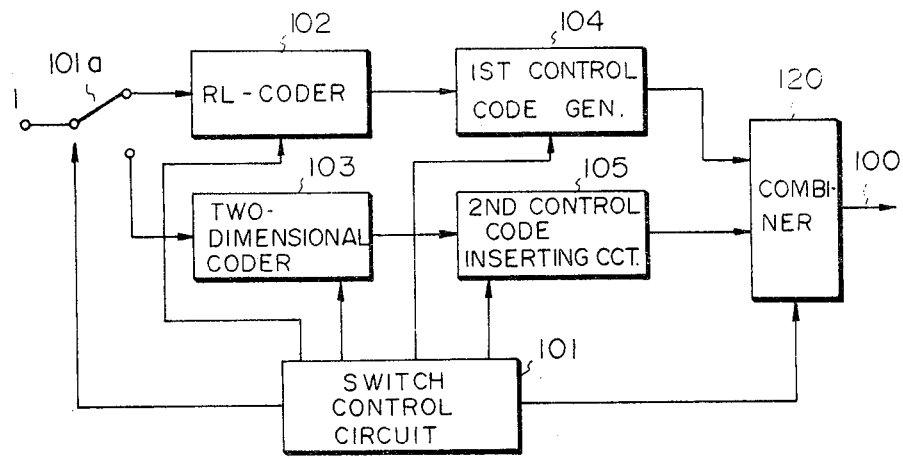
FIG. 12 shows in block form another embodiment of this invention.
Figure 13:
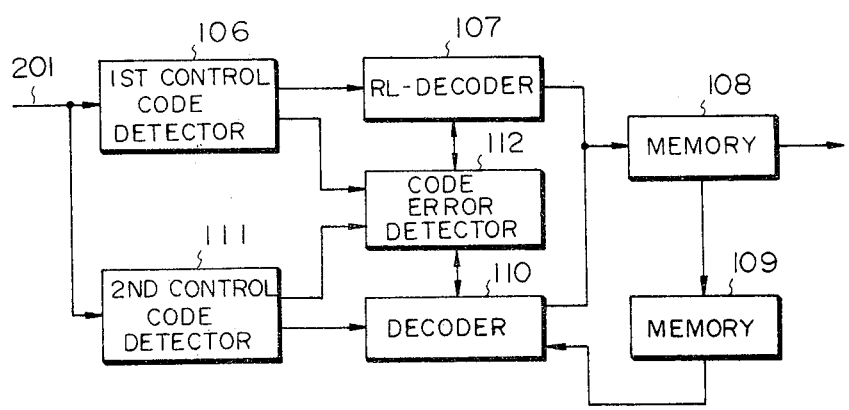
FIG. 13 shows in block form an example of a decoding device for a facsimile signal ecoded by the embodiment of FIG. 12.

FIG. 12 illustrates in block form a coding device embodying the present invention based on such principles, and FIG. 13 a corresponding decoding device. A facsimile picture signal input line 1 is connected via a switch 101a to an RL coder 102 every K lines under the control of a switch control circuit 101. At this time, a first control code generator 104 generates a first control code and the RL coder 102 encodes a line (No. 1) into a run-length code. Upon completion of this encoding, the switch 101a is connected to a two-dimensional coder 103 of this invention to achieve two-dimensional coding of lines No. 2 to No. K according to this invention and a second control code is inserted by a second control code inserting circuit 105 just before the coded signal of each scanning line.

On the side of the decoding device shown in FIG. 13, when the first control code is detected by a first control code detector 106, the run-length code is decoded by a run-length code decoder 107 for one line (No. 1) only and the reproduced picture element information is stored in a line memory 108 and, upon completion of decoding of the line No. 1, the content of the line memory 108 is transferred to a line memory 109. Thereafter, successive decoding of the lines No. 2, No. 3, ... No. K corresponding to the coding of this invention is effected by such a decoder 110 as shown in FIGS. 5A and 10A using the content of the line memory 109. Upon completion of decoding of each line, the control codes are detected by the control code detectors 106 and 111, and it is checked by a code error detector 112 for occurrence of a code error. Once a code error has occurred in a scanning line, no decoding takes place until the scanning line No. K. Then, upon detection of the first control code, an ordinary decoding operation is started to restore from the code error state.

As has been described in the foregoing, the present invention has the advantage that highly efficient coding can be achieved without depending on correlation, between adjacent lines of signals, by properly selecting the two kinds of coding systems in which a signal having high correlation between adjacent lines, such as a two-level facsimile signal, is encoded with high efficiency using a distance between a change picture element to be encoded and an adjoining one, and in which in a case of a part having no correlation to a line just above it, just like a first line of a document, a change picture element is encoded using a distance between it and another picture element of the same line.

The present invention has another advantage that by inserting a self-synchronized first control code, for example, every K scanning lines, encoding only one scanning line into run-length codes, encoding the subsequent scanning lines according to this invention and then checking for a code error upon completion of coding of the said one scanning line, degradation of the picture quality due to the code error is prevented from spreading, thereby to enable rapid restoration from the code error state.

In the following, another embodiment of this invention relating to the second object will now be described, in which the two dimensional coding principle as described above and the one dimensional coding principle, such as the run-length coding principle, are adaptively adopted.

Figure 8C:
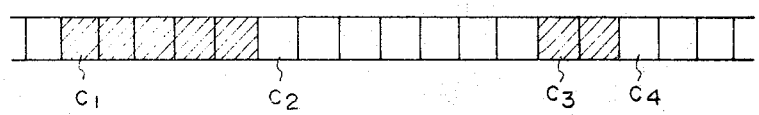

Next, an example of the one-dimensional coding will be described. FIG. 8C shows an example of a facsimile signal. In the one-dimensional coding system, a run from a picture element $C_1$ to a picture element directly before a picture element $C_2$ consists of five black picture elements, and hence is coded into "0011", for example, according to the MH code in Table 1; a run from the picture element $C_2$ to a picture element immediately before a picture element $C_3$ consists of seven white picture elements, and hence is coded into "1111"; and a run from the picture element $C_3$ to a picture element immediately before a picture element $C_4$ consists of two black picture elements, and hence is coded into "11". These coded trains are stored or outputted as a one-dimentional coded line.

The following will describe examples of circuits for applying this invention into practice in accordance with the principles described above.

Figure 14:
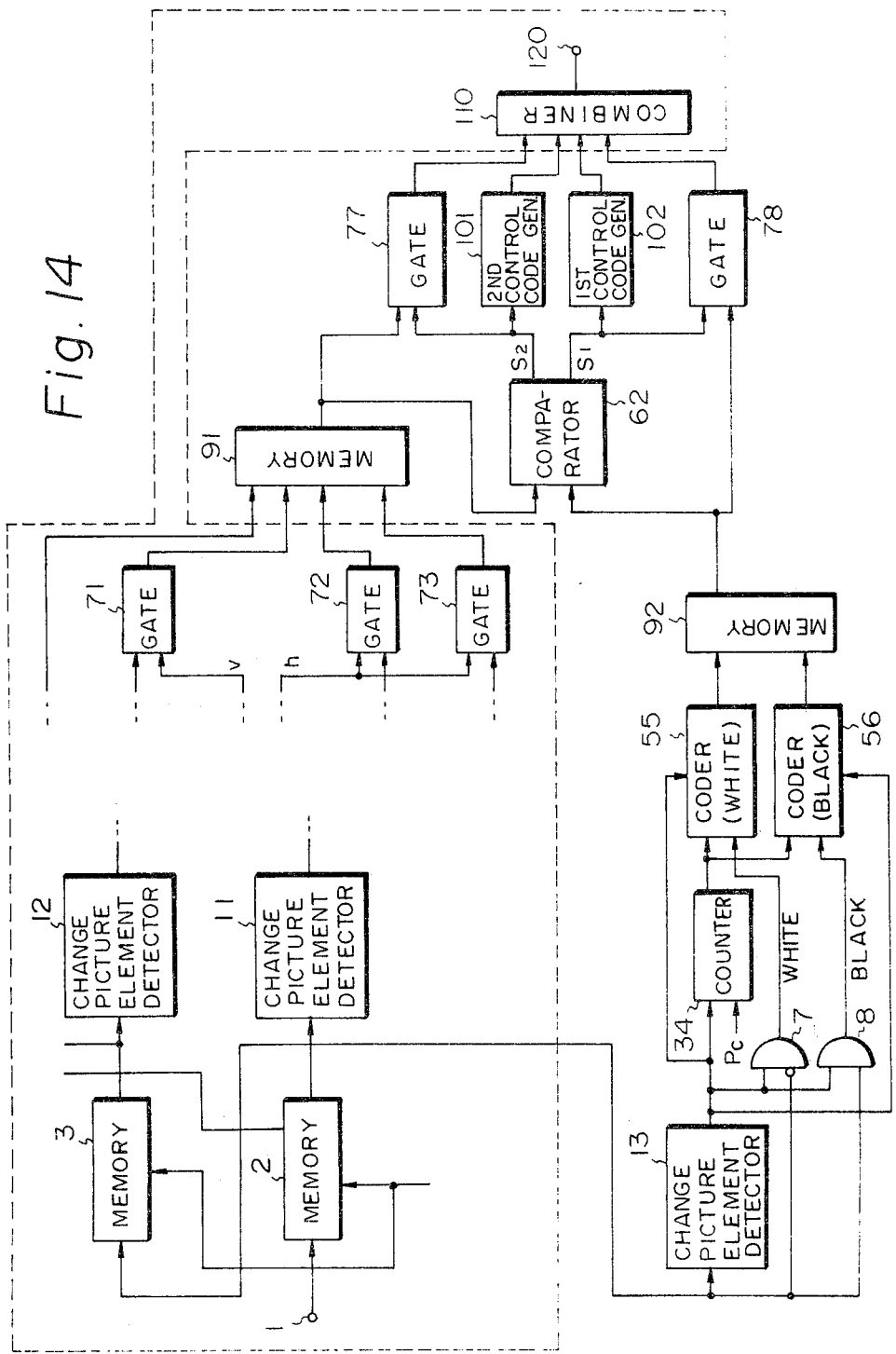
FIGS. 14 and 17 are block diagrams each illustrating another embodiment of this invention.

FIG. 14 is an example of a coding device, in which the part indicated by a dotted enclosure is the same as FIG. 9. A change picture element detector 13 is composed of a 1-bit memory and an exclusive OR circuit as shown in FIG. 4B. There are further provided a NAND circuit 7, an AND circuit 8, a counter 34, coders 55 and 56, coded signal memories 91 and 92, a comparator 62, tates 77 and 78, a first control code generator 102, and a second control code generator 101.

Next, the construction and operation of this embodiment will be described in detail. A fascsimile signal to be coded is provided from the input terminal 1 to the coding line memory 2 for storage therein. Before this time, as a signal of a reference line, a signal of the preceding line stored in the line memory 2 is transferred to the reference line memory 3 for storage therein. The $a_0$ memory 4 has stored therein level of the starting picture element $a_0$, as will be described later on. Reading of the coding line memory 2 and the reference line memory 3 simultaneously starts from the position of the starting picture element $a_0$ under the control of the address control circuit 5.

The change picture element detectors 11, 12 and 13 respectively are each constructed, as shown in FIG. 4B, and compare the picture element signals read out of the line memories 2 and 3, respectively, with immediately preceding picture element signals of each line to output "0" or "1" in dependence on whether the former signals are of the same level as the latter signals or not.

The $b_1$ detector 23 is an AND circuit which provides "1" on the output line $b_{1p}$ when a change picture element is detected by the change picture element detector 12 and level of the detected change picture element differs from that of the starting picture element $a_0$, that is, when the output from the exclusive OR circuit 6 is "1". The $b_2$ detector 24 procides "1" on an output line $b_{2p}$ in a case where a change picture element is detected by the change picture element detector 12 after detection of the change picture element $b_1$ by the $b_1$ detector 23; this $b_1$ detector 24 can be made up of one flip-flop and an AND circuit. The Pass mode detector 40 is an AND circuit which provides "1" on an output line p, judging that the mode of operation is the Pass mode in a case where the picture element $a_1$ has not been detected at the moment of occurrence of "1" on the output line $b_{2p}$ (in this case, $a_{1n}$ which is the output $\overline{Q}$ of a flip-flop in the $a_1$ detector 21 is "1"), as will be described later. With "1" on the output line p, the Pass mode coder to the coded signal memory 91. Following this, a new starting picture element is shifted to the position just under the picture element $b_2$ in the following manner: Upon ocurrence of "1" on the line $b_{2p}$, the $b_2$ address register 81 stops counding of pulses from the address control circuit 5 and stores the count value. This information is applied via the gate 74 to the $a_0$ address register 84 at the moment of the Pass mode detector 40 providing "1" on the line p. The contents of the $a_0$ address register 84 are applied to the address control circuit 5 to re-start the coding operation with the new starting picture element $a_0$.

The change picture element detector 11, when detecting a change picture element, provides an output "1" to the $a_1$ detector 21 (a flip-flop). As a result of this, the information on the lines $a_{1p}$ and $a_{1n}$ change from "0" to "1" and from "1" to "0", respectively. The $a_2$ detector 22 is a flip-flop which outputs "1" on a line $a_{2p}$ when a change picture element is detected by the change picture element detector 11 after the picture element $a_1$ is detected by the $a_1$ detector 21 ("1" on the line $a_{1p}$). The $a_0a_1$ counter 32 starts counting of pulses from the moment of setting $a_0$ in the address control circuit 5, but stops the counting upon reception of "1" from the line $a_{1p}$ and provides the count value to the $a_0a_1$ coder 52. The $a_0a_1$ coding circuit encodes the count value with "1111" added to its head, using such a code table as shown in the column of the Horizontal mode of Table 1. The $a_1a_2$ counter 31 starts counting with "1" on the line $a_{1p}$ and stops the counting with "1" on the line $a_{2p}$ and provides the count value to the $a_1a_2$ coder. The $a_1a_2$ coder 51 encodes the count value using such a code table as shown in the column MH(xy) of Table 1. The $b_1a_1$ counter 33 43ceives the outputs from the lines $b_{1p}$ and $a_{1p}$ and starts pulse counting with a first appearing "1" in either one of the outputs and stops the counting with a next appearing "1" in the other. To the $b_1a_1$ direction detector 25 are also applied the outputs from the lines $b_{1p}$ and $a_{1p}$ and, with the circuit construction shown in FIG. 4C, this detector outputs "1" on a line + when "1" of the line $b_{1p}$ appears earlier than or simultaneously with "1" of the line $a_{1p}$ but, in the opposite case, provides an output "1" on a line −.

The $b_1a_1$ coder 53 encodes $b_1a_1$ with a sign + or − added thereto on the basis of the count value of the $b_1a_1$ counter 33 and the output of the line + or − from the $b_1a_1$ direction detector 25, as shown in the column of the Vertical mode of Table 1. The bit numbers encoded by the coders 52 and 53 are compared in magnitude with each other in the comparator 61; when the condition $[a_0a_1] > [b_1a_1]$ is established, "1" is provided on the line V (Vertical mode), whereas when this condition is not established, "1" is provided on the line h (Horizontal mode). In a case of the Vertical mode in which "1" is outputted on the line V of the comparator 61, the coded signal of the $b_1a_1$ coder 53 is provided via the gate 71 to the coded signal memory 91. On the other hand, in the Horizontal mode in which "1" is yielded on the line h, the gates 72 and 73 are opened to apply therethrough the coded signals of the $a_0a_1$ and $a_1a_2$ coders 52 to the coded signal memory 91.

The change picture element detector 13 is a detector for the one-dimensional coding. Upon detection of a change picture element by this detector, the counter 34 starts counting of clock pulses Pc and, upon detection of the next change picture element, this counting is once stopped, and the count value at this moment is coded by the coder 55 or 56 of the next stage.

The output from the counter 34 is coded by the coder 55 or 56 in dependence on whether the signal is white or black. Namely, a signal from the coding line memory 2 and the output from the change picture element detector 13 are applied to the NAND circuit 7 and the AND circuit 8, and the outputs from the NAND circuit 7 and the AND circuit 8 are applied to the coders 55 and 56 respectively; the coder 55 or 56 operates in dependence on whether the outputs from the NAND circuit and the AND circuit are each "0" (white) or "1" (black). In this manner, the count value of the counter 34 is applied to the coder 55 or 56 and coded therein by the MH code of Table 1, thereafter being provided as a one-dimensional coded train to the coded signal memory 92. The coded output signal thus stored in the coded signal memory 91 is a two-dimensional coded signal, thereas the coded output signal stored in the coded signal memory 92 is a one-dimensional coded signal. These coded signals are applied to the comparator 62 and compared with each other, for example, in the number of bits for each line in the outputs from the memories 91 and 92 for selecting a more advantageous one of the both memory output signals.

Where the one-dimensional coding is judged to be advantageous as a result of the comparison in the comparator 62, an output $S_1$ becomes "1" to open the gate 78 for passing on the information of the coded signal memory 92 to the signal combiner 110. At the same time, the first control code generator 102 provides a first control code (a first line cynchronizing signal LSS1), for example, "01111111" representing that the line is a one-dimensional coded line. This control code is added to the head of the information of the coded signal memory 92.

In case the two-dimensional coding is judged to be advantageous as a result of the comparison in the comparator 62, an output $S_2$ becomes "1" to open the gate 77 for applying therethrough the information of the coded signal memory 91 to the signal combiner 110. At the same time, the second control code generator 101 provides a second control code (a second line synchronizing signal LSS2), for example, "01111110" indicating that the line is a two-dimensional coded line. This control code is added to the head of the information of the coded signal memory 91. The signal combiner 110 combines the control code from the control edge generator 101 or 102 and the signal from the gate 77 or 78 into a composite signal, which is sent out from the output terminal 120 after being converted into an output signal train.

In a case of producing the first and second control codes in the form of "01111111" and "01111110" respectively, as described above, in order to make these control codes distinguishable from other codes, it is necessary, for example, to compulsorily insert "0" in the control codes every five "1s" occurring successively in the coded signals, like "11111010"...". Needless to say, the decoding side decodes the coded signals removing "0" next to "11111" in the coded signal.

For the sake of brevity, the conditions for resetting the detectors, registers, counters and so forth are neither described in the foregoing nor shown in the drawings; but, required ones of these circuits (the $b_2$ detector 24, the $a_1$ detector 21, the $a_2$ detector 22, the registers 81, 82 and 83, the $b_1a_1$ direction detector 25, the counters 31, 32 and 33 and so forth) are reset for each setting of the picture element $a_0$.

The interruption of the operation of this coding device is placed under the control of the address control circuit. Namely, the $a_0$ address is always watched by the address control circuit 5, and the coding is stopped at the moment when the $a_0$ address becomes a line terminating picture element, and the $a_0$ address is newly set to a line starting picture element, and then coding of the subsequent line is resumed.

Figure 15:
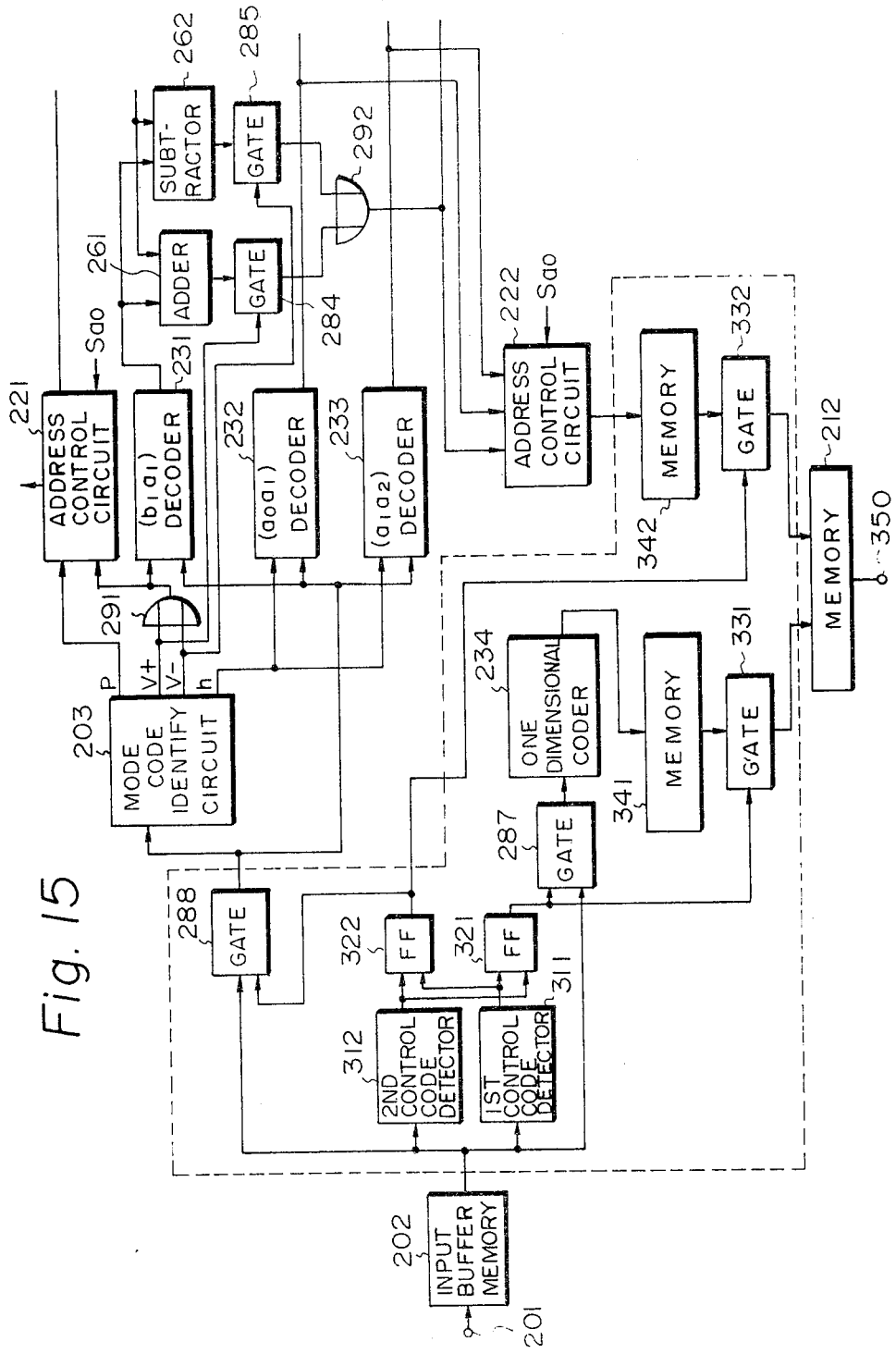
FIG. 15 is a block diagram illustrating an example of a decoding device for a facsimile signal encoded by the embodiment of FIG. 14.

An example of a decoding device for receiving a facsimile signal encoded by the embodiment of FIG. 14 is shown in FIG. 15, in which circuits enclosed by a dotted enclosure are further added to the decoding device shown in FIG. 10A. The enclosure part comprises a first control code detector 311, a second control code detector 312, flip-flops 321 and 322, gates 287, 331 and 332, a one-dimensional coder 234, and decoded signal memories 341 and 342.

The following will describe the construction and the operation of the decoding device of FIG. 15 in detail. A coded signal from the input terminal 201 is once stored in the input buffer memory 202. The signal from the input buffer memory 202 is checked first by the first and second control code detectors 311 and 312 as to whether the signal is the one-dimensional or two-dimensional coded one.

If the inputted control code is, for example "01111110", the signal is judged as the two-dimensional coded one, and the second control code detector 312 provides an output "1" to set the flip-flop 322, opening the gate 288. When the control code is, for example, "01111111", the signal is judged as the one-dimensional coded signal, and the first control code detector 311 yields an output "1" to set the flip-flop 321, opening the gate 287. At this time, the flip-flop 322 is reset; consequently, the gate 288 is cut off.

In a case of the two-dimensional coded signal being applied to open the gate 288, the mode code identify circuit 203, which has such a construction as shown in FIG. 5B, responds to opening of the gate 288 to read a required number of signals (for example, four bits at most, as shown in Table 1) from the input buffer memory 202, identifying the mode of the input signal, i.e. any of the Pass mode, the Horizontal mode and the Vertical mode. When the signal is "1110", it is regarded as indicating the Pass mode, and "1" is outputted on a line p; when the signal is "1111", it is regarded as indicating the Horizontal mode, and "1" is provided on a line h; when the signal is "0", "100" or "1100", it is regarded as indicating that the direction of the distance $b_1a_1$ is plus in the Vertical mode, and "1" is produced on a line $V+$; and when the signal is "101" or "1101" it is regarded as indicating that the direction of the distance $b_1a_1$ is minus in the Vertical mode, and "1" is yielded on a line $V-$. The address control circuit 221 has such a construction as depicted in FIG. 5C, from which when any one of the outputs p, $V-$ and $V+$ from the mode code identify circuit is "1", pulses provided from $Sa_0$ are applied to the memory 211 to shift it bit by bit from the $a_0$ address.

When the identify circuit 203 provides "1" on the line p, the address control circuit 221 shifts the reference line memory 211 from the address of the picture element $a_0$ to start detection of the picture elements $b_1$ and $b_2$. The reference line memory 211 has prestored therein information of the previous line via the decoded line memory 212. The change picture element detector 240 has the construction shown in FIG. 4B and provides an output "1" upon each detection of a picture element different from the immediately preceding one in the signal train applied from the line memory 211. At the moment when the change picture element detector 240 provides the output "1", if the detected picture element is different in level from the picture element $a_0$, the output "1" is applied via the exclusive OR circuit 293 to the $b_1$ detetor (an AND circuit) 251 to produce an output "1" on a line $b_{1p}$. The $a_0b_1$ counter 272 receives pulses from the address control circuit 221 and counts the number of pulses occurring in the time interval from the $a_0$ address to $b_1$ (unit "1" is provided on the line $b_{1p}$). The $b_2$ detector 252 outputs "1" on a line $b_{2p}$ when another change picture element is detected by the change picture element detector 240 after detection of the picture element $b_2$ ("1" on the line $b_{1p}$). This $b_1$ detector comprises a flip-flop and an AND circuit. The $a_0b_2$ counter 271 receives pulses from the address control circuit 221 and counts them occurring in the time interval from the $a_0$ address to $b_2$ (until "1" is provided on the line $b_{2p}$). Upon occurrence of "1" on the line $b_{2p}$, the address control circuit 221 once stops sending out of the shift pulses. The information of the $a_0b_2$ counter 271 is applied to the $a_0$ register 300 via the gate 281, which is opened by the provision of the output "1" on the line p of the mode code identify circuit 203. The contents of the $a_0$ register 300 are added to the address control circuits 221 and 222, so that the $a_0$ address is newly set and the decoding operation is resumed.

In a case where the identify circuit 203 provides "1" on the line $V+$ or $V-$ (Vertical mode), the output "1" from the OR circuit 291 is applied to the address control circuit 221 and the $b_1a_1$ decoder 231. As a consequence, decoding relating to the abovesaid $b_1$ and $b_2$ takes place, and the count value of the $a_0b_1$ counter indicates the address of the picture element $b_1$ relative to the picture element $a_0$. The $b_1a_1$ decoder 231 reads signals of one word from the input buffer memory 202 and decodes them. The decoded value is added by the adder 261 to the value of the $a_0b_1$ counter 272 and, at the same time, subtracted by the subtractor 262 from the value of the $a_0b_1$ counter 272. In a case where the output line V+ of the mode code identify circuit 203 is "1", the gate 284 is opened, so that the contents of the adder 261 is provided via the OR circuit 292 to the address control circuit 222 and to the $a_0$ register 300 via the gate 282. In contrast thereto, if the output line V− of the mode code identify circuit 203 is "1", the gate 285 is opened, passing the contents of the subtractor 262 to the address control circuit 222 via the OR circuit 292 and to the $a_0$ register 300 via the gate 282.

The address control circuit 222 has such a construction as depicted in FIG. 10B, which sets up the address of the picture element $a_1$ on the basis of the contents transmitted thereto via the OR circuit 292, reproduces the picture element signals on the decoded line from the picture element $a_0$ to a picture element immediately preceding $a_1$ identical with the level of the picture element $a_0$ and inverts the level of the picture element $a_1$ relative to the level of the picture element $a_0$. The content of the $a_0$ register 300 is applied to the address control circuits 221 and 222, newly setting the address of the picture element $a_0$ and resuming decoding.

In a case where the line h of the mode code identify circuit 203 becomes "1" (Horizontal mode), the $a_0a_1$ and $a_1a_2$ decoders 232 and 233 successively read signals of two words from the input buffer memory 202 and the $a_0a_1$ decoder 232 decodes the first one word and the $a_1a_2$ decoder 233 the second one word. The decoded values are added to the address control circuit 222 and to the $a_0$ register 300 via the gate 283 or 286. The address control circuit 222 sets up the addresses of the picture elements $a_1$ and $a_0$, reproduces the picture element signal on the decoded line from the picture element $a_0$ to a picture element immediately preceding $a_1$ to be the same level as that of the picture element $a_0$ and inverts the level of the picture element $a_1$ and, thereafter, reproduces the picture element signals from the picture element $a_1$ to a picture element immediately preceding $a_1$ to be the same level as that of the picture element $a_1$ and sets the level of the picture element $a_2$ to be different from the level of the picture element $a_1$. The $a_0$ address register 300 restores the address of the picture elements $a_1$ and $a_2$, so that the $a_2$ address becomes a new $a_0$ address. This new information is provided to the address control circuits 221 and 222 to set the $a_0$ address and restart decoding.

The two-dimensional decoded outputs of the Vertical and Horizontal modes thus applied to the address control circuit 222 is processed therein as described above and then stored in the decoded signal memory 342. In this case, since the flip-flop 322 is in the set state, the gate 332 is opened by its output, so that the two-dimensional decoded signal stored in the decoded signal memory 342 is applied to the decoded line memory 212 and then outputted via the output terminal 350.

Next, when the first control code detector 311 detects the control code indicating the one-dimensional coded signal, the gate 287 is opened, as mentioned above, and the signal of the line is decoded by the one-dimensional decoder 234, thereafter being stored in the decoded signal memory 341. At this time, since the gate 331 is open, the one-dimensional decoded signal is provided to the decoded line memory 212, thereafter being outputted via the output terminal 350.

Also in respect of the above decoding device, the resetting conditions for the detectors, the registers, the counters and so forth have been neither described nor shown in the drawings; but required ones of them (the mode code identify circuit 203, the $b_2$ detector 252, the address control circuits 221 and 222, the counters 271 and 272, the decoders 231, 232 and 233, etc.) are reset for each setting of the $a_0$ address. The termination of one line is achieved by supervising the $a_0$ address with the address control circuit 222 and, at the moment of the address of the picture element $a_0$ becoming the address of the last picture element of a scanning line, decoding of that line is completed and decoding of the next line is resummed.

In the embodiment described above, the numbers of bits of the one-dimensional and two-dimensional coded signals for each line are compared, and the coded signal of a smaller number of coded bits is selected; but this comparison between the amounts of information of the one-dimensional and two-dimensional coded signals is not limited specifically to the above. For example, the absolute number and a predetermined reference number of picture element changing points of the line to be coded are compared with each other; if the former is smaller than the latter, the one-dimensional coded line is used, and if the latter is smaller than the former, the two-dimensional coded line is used. Similarly, a difference between the absolute number of picture element changing points of the line to be coded and the absolute number of picture element changing points of an immediately preceding reference line is compared with a predetermined reference number; if the former is smaller than the latter, the two-dimensional coded line is used, and if the former is larger than the latter, the one-dimensional coded line is used.

In the above, the one-dimensional and two-dimensional coded lines are selectively employed in accordance with the results of comparison between the amounts of information of the one-dimensional and two-dimensional coded signals at the end of scanning of one line, but it is also possible to perform coding and comparison for each signal of a predetermined length on one scanning line. Moreover, while the above embodiment has been described in connection with a case of using the two-dimensional sequential coding system, the invention can be carried into practice even if some other two-dimensional coding system is used.

Figure 16:
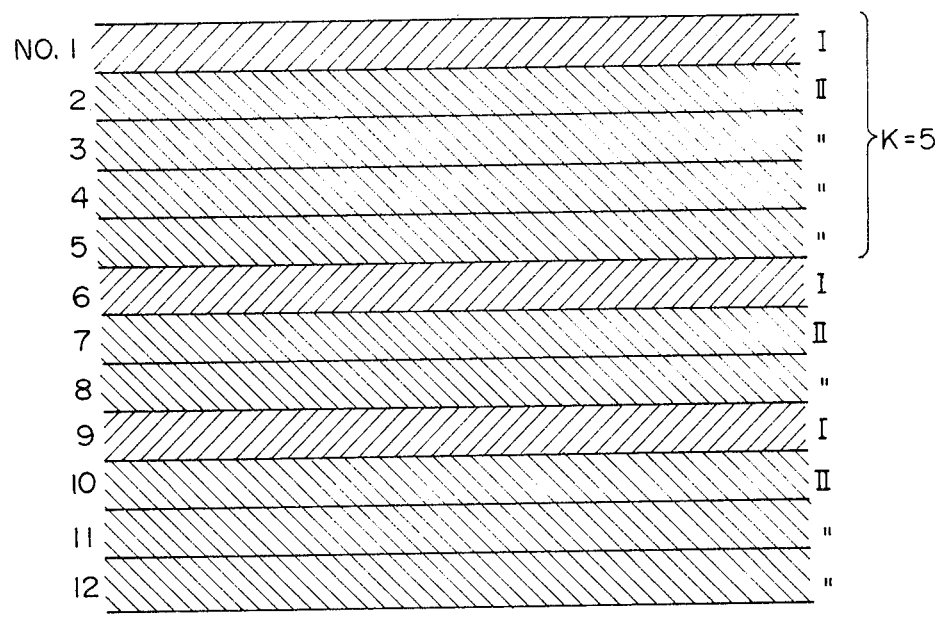

As described in the foregoing, according to this invention, a digital facsimile signal is coded by the one-dimensional and the two-dimensional coding system for each line and, in accordance with the amounts of information of the two coded signals, a more favorable one of them is selected as a coded output, for example, as shown in FIG. 16. Accordingly, there is the possibility that two-dimensional coded outputs are sucessively produced over a number of lines. With the two-dimensional coding system, however, each line is coded and decoded utilizing picture signal information of a reference line immediately preceding it, as described previously, and a code error resulting from a circuit noise or the like is likely to lead to a substantial degradation of the picture quality of reproduced pictures in those lines following that in which the code error has occurred. Therefore, in a case where when a code error is detected, a request repeat system can be used as in a four-wire private circuit or data communication network and a two-wire network circuit like an ordinary telephone circuit is employed, it is necessary to prevent spreading of the error.

Next, a description will be given of a system for limiting degradation of the picture quality of a reproduced picture due to the code error. This is to prevent that in the one-dimensional, two-dimensional adaptive coding system described in the foregoing, the number of two-dimensional coded lines being outputted in succession exceeds, for example, K lines (K is selected suitably but is shown to be five.), as shown in FIG. 16.

In FIG. 16, in a case where it is judged that a one-dimensional coded line is favorable for a first line and that two-dimensional coded lines are favorable for second to eighth lines, a one-dimensional coded line is compulsorily used for the sixth line instead of the two-dimensional coded line so that K does not exceed five. In FIG. 16, for a ninth line, a one-dimensional coded output is produced according to the judgement that it is favorable for the line. Even if the one-dimensional coded line is selected as a result of comparison between the one-dimensional and two-dimensional coded lines, a one-dimensional coded line is thus compulsorily inserted after K-1 successive two-dimensional coded lines counting from the one-dimensional coded line. Accordingly, a one-dimensional coded line may in some cases be inserted after two-dimensional lines less than K are outputted.

Figure 17:
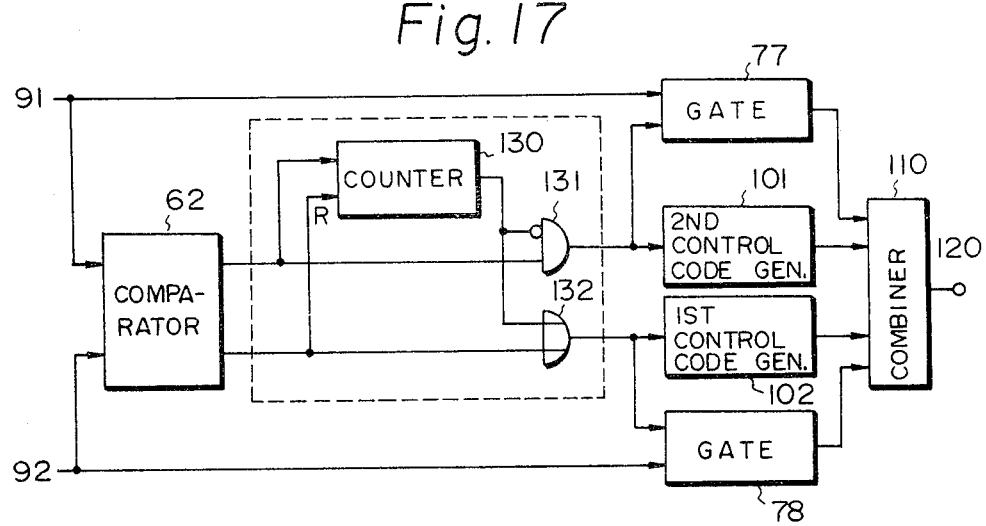

In an embodiment of this invention based on such principles, there are provided in the coding device a scale-of-K counter 130, an inhibit circuit 131 and OR circuit 132, as indicated by the broken line in FIG. 17. When the output $S_2$ from the comparator 62 is produced successively of K lines, the output $S_2$ is inhibited by the inhibit circuit 131, and the output from the OR circuit 132 is applied to the first control code generator 102 and the gate 78, with the result that the first control code and a one-dimensional coded signal are transferred to the signal combiner 110. For the decoding device, however, no modification is needed.

As has been described in detail in the foregoing, the present invention permits a substantial reduction of the amount of information to be transmitted and prevents spreading of degraded picture quality due to a code error or the like.

What we claim is:

1. A transmission method for a facsimile signal, in which a two-level facsimile signal obtained by scanning an original picture and successively sampling the scanning output into picture elements is received, as an input, and in which the position of an information change picture element having changed from one to the other of two signal levels is coded and sent out, the improvement of the method comprising:

a first step of setting a starting picture element on a coding scanning line to be coded from which the coding starts;

a second step of detecting a first information change picture element lying next to the starting picture element on the coding scanning line;

a third step of detecting a first reference picture element, which is a first information change picture element lying after a picture element just above the starting picture element on a reference scanning line immediately preceding the coding scanning line and has a signal level different from that of the starting picture element, and a second reference picture element of an information change picture element next to the first reference picture element;

a fourth step of detecting, as a first mode, the state in which the second reference picture element precedes a picture element just above the first information change picture element by more than n (n being 0 or a positive integer) picture elements;

a fifth step of detecting, as not the first mode, the state in which the second reference picture element does not precede a picture element just above the first information change picture element by more than n picture elements;

a sixth step of comparing a first correlation between the starting picture element and the first information change picture element with a second correlation between the first information change picture element and the first reference picture element when the abovesaid state is detected as not the first mode;

a seventh step of coding the presence of the first and second reference picture elements as the first mode and setting the picture element just below the second reference picture element as the starting picture element in the first step when the first mode is detected;

an eighth step of coding a distance between the starting picture element and the first information change picture element as a second mode and setting the first information change picture element as the starting picture element in the first step when the first correlation is higher than the second correlation;

a ninth step of coding the distance between the first information change picture element and the first reference picture element as a third mode and setting the first information change picture element as the starting picture element in the first step when the first correlation is not higher than the second correlation; and a tenth step of sending out the coded outputs of the seventh, eighth and ninth steps after combining them into a composite signal of two-dimensional codes.

2. A transmission method for a facsimile signal according to claim 1, further including;

an eleventh step of successively coding by a one-dimensional method information change picture elements on a coding scanning line to be coded for each predetermined length of the coding scanning line to develop one-dimensional codes and storing the one-dimensional codes;

a twelfth step of comparing the information amount of the one-dimensional codes and the two-dimensional codes stored for each predetermined length of the coding scanning line;

a thirteenth step of selecting said composite signal as an output when the information amount of the one-dimensional codes is higher than the information amount of the two-dimensional codes;

a fourteenth step of selecting the one-dimensional codes as an output when the information amount of the one-dimensional codes is not higher than the information amount of the two-dimensional codes; and a fifteenth step of adding a peculiar control code to the coded output of each of the thirteenth and fourteenth steps for sending out them after combining into a composite transmission signal.

3. A transmission method for a facsimile signal, in which a two-level facsimile signal obtained by scanning an original picture and successively sampling the scanning output into picture elements is received as an input, and in which the position of an information change picture element having changed from one to the other of two signal levels is coded and sent out, the improvement of the method comprising:

a first step of setting a starting picture element on a coding scanning line to be coded from which the coding starts;

a second step of detecting a first information change picture element lying next to the starting picture element on the coding scanning line;

a third step of detecting a first reference picture element, which is a first information change picture element lying after a picture element just above the starting picture element on a reference scanning line immediately preceding the coding scanning line and has a signal value different from that of the starting picture element, and a second reference picture element which is an information change picture element next to the first information change picture element;

a fourth step of detecting, as a first mode, the state in which the second reference picture element precedes a picture element just above the first information change picture element by more than n (n being 0 or a positive integer) picture elements;

a fifth step of detecting, as not the first mode, the state in which the second reference picture element does not precede a picture element just above the first information change picture element by more than n picture element;

a sixth step of comparing a first correlation between the starting picture element and the first information change picture element with a second correlation between the first information change picture element and the first reference picture element when the abovesaid state is detected as not the first mode;

a seventh step of coding the presence of the first and second reference picture elements as the first mode and setting the picture element just below the second reference picture element as the starting picture element in the first step when the first mode is detected;

an eighth step of coding a distance between the starting picture element and the first information change picture element as a second mode and setting the first information change picture element as the starting picture element in the first step when the first correlation is higher than the second correlation;

a ninth step of coding a distance between the first information change picture element and the first reference picture element as a third mode and setting the first information change picture element as the starting picture element in the first step when the first correlation is not higher than the second correlation;

a tenth step of temporarily stopping the two-dimensional coding operation every time the number of coding scanning lines has reached a predetermined value and coding the positions of information change picture elements of the next coding scanning line only without referring to the positions of information change picture elements of another scanning line; and an eleventh step of sending out the coded outputs of the seventh, eighth, ninth and tenth steps after combining them into a composite signal of two-dimensional codes.

4. A transmission method for a facsimile signal according to claim 3, further including:

a twelfth step of successively coding by a one-dimensional method information change picture elements on a coding scanning line to be coded for each predetermined length of the coding scanning line to develop one-dimensional codes and storing the one-dimensional codes;

a thirteenth step of comparing the information amount of the one-dimensional codes and the two-dimensional codes stored for each predetermined length of the coding scanning line;

a fourteenth step of selecting said composite signal as an output when the information amount of the one-dimensional codes is higher than the information amount of the two-dimensional codes;

a fifteenth step of selecting the one-dimensional codes as an output when the information of the one-dimensional codes is not higher than the information amount of the two-dimensional codes; and a sixteen step of adding a peculiar control code to the coded output of each of the fourteenth and fifteenth steps for sending out them after combining into a composite transmission signal.

5. A transmission method for a facsimile signal in which a two-level facsimile signal obtained by scanning an original picture and successively sampling the scanning output into picture elements is received as an input, and in which the position of an information change picture element having changed from one to the other of two signal levels is coded and sent out, the improvement of the method comprising:

a first step of setting a starting picture element on a coding scanning line to be coded from which the coding starts;

a second step of detecting first and second information change picture elements sequentially lying after the starting picture element on the coding scanning line;

a third step of detecting a first reference picture element, which is a first information change picture element lying after a picture element just above the starting picture element on a reference scanning line immediately preceding the coding scanning line and has a signal value different from that of the starting picture element, and a second reference picture element which is an information change picture element next to the first information change picture element;

a fourth step of detecting, as a first mode, the state in which the second reference picture element precedes a picture element just above the first information chnage picture element by more than n (n being 0 or a positive integer) picture elements;

a fifth step of detecting, as not the first mode, the state in which the second reference picture element does not precede a picture element just above the first information change picture element by more than n picture elements;

a sixth step of comparing a first correlation between the starting picture element and the first information change picture element with a second correlation between the first information change picture element and the first reference picture element when the abovesaid state is detected as not the first mode;

a seventh step of coding the presence of the first and second reference picture elements as the first mode and setting the picture element just below the second reference picture element as the starting picture element in the first step when the first mode is detected;

an eighth step of coding a distance between the starting picture element and the first information change picture element and a distance between the first and second information change picture elements as a second mode and setting the second information change picture element as the starting picture element in the first step when the first correlation is higher than the second correlation;

a ninth step of coding a distance between the first information change picture element and the first reference picture element as a third mode and setting the first information change picture element as the starting picture element in the first step when the first correlation is not higher than the second correlation; and a tenth step of sending out the coded outputs of the seventh, eighth and ninth steps after combining them into a composite signal of two-dimensional codes.

6. A transmission method for a facsimile signal according to claim 5, further including:

an eleventh step of successively coding by a one-dimensional method information change picture elements on a coding scanning line to be coded for each predetermined length of the coding scanning line to develop one-dimensional codes and storing the one-dimensional codes;

a twelfth step of comparing the information amount of the one-dimensional codes and the two-dimensional codes stored for each predetermined length of the coding scanning line;

a thirteenth step of selecting said composite signal as an output when the information amount of the one-dimensional codes is higher than the information amount of the two-dimensional codes;

a fourteenth step of selecting the one-dimensional codes as an output when the information of the one-dimensional codes is not higher than the information amount of the two-dimensional codes; and a fifteenth step of adding a peculiar control code to the coded output of each of the tenth, thirteenth and fourteenth steps for sending out them after combining into a composite transmission signal.

7. A transmission method for a facsimile signal, in which a two-level facsimile signal obtained by scanning an original picture and successively sampling the scanning output into picture elements is received as an input, and in which the position of an information change picture element having changed from one to the other of two signal levels is coded and sent out, the improvement of the method comprising:

a first step of setting a starting picture element on a coding scanning line to be coded from which the coding starts;

a second step of detecting first and second information change picture elements sequentially lying after the starting picture element on the coding scanning line;

a third step of detecting a first reference picture element, which is a first information change picture element lying after a picture element just above the starting picture element on a reference scanning line immediately preceding the coding scanning line and has a signal level different from that of the starting picture element, and a second reference picture element which is an information change picture element next to the first reference change picture element;

a fourth step of detecting, as a first mode, the state in which the second reference picture element precedes a picture element just above the first information change picture element by more than n (n being 0 or a positive integer) picture elements;

a fifth step of detecting, as not the first mode, the state in which the second reference picture element does not precede a picture element just above the first information change picture element by more than n picture elements;

a sixth step of comparing a first correlation between the starting picture element and the first information change picture element with a second correlation between the first information change picture element and the first reference picture element when the abovesaid state is detected as not the first mode;

a seventh step of coding the presence of the first and second reference picture elements as the first mode and setting the picture element just below the second reference picture element as the starting picture element in the first step when the first mode is detected;

an eighth step of coding a distance between the starting picture element and the first information change picture element and a distance between the first and second information change picture elements as a second mode and setting the second information change picture element as the starting picture element in the first step when the first correlation is higher than the second correlation;

a ninth step of coding a distance between the first information change picture element and the first reference picture element as a third mode and setting the first information change picture element as the starting picture element in the first step when the first correlation is lower than the second correlation;

a tenth step of temporarily stopping the two-dimensional coding operation every time the number of coding scanning lines has reached a predetermined value and coding the positions of information change picture elements of the next coding scanning line only without referring to the positions of information change picture elements of another scanning line;

an eleventh step of sending out the coded outputs of the seventh, eighth, ninth and tenth steps after combining them into a composite signal of two-dimensional codes.

8. A transmission method for a facsimile signal according to claim 7, further including:

a twelveth step of successively coding by a one-dimensional method information change picture elements on a coding scanning line to be coded for each predetermined length of the coding scanning line to develop one-dimensional codes and storing the one-dimensional codes;

a thirteenth step of comparing the information amount of the one-dimensional codes and the two-dimensional codes stored for each predetermined length of the coding scanning line;

a fourteenth step of selecting said composite signal as an output when the information amount of the one-dimensional codes is higher than the information amount of the two-dimensional codes;

a fifteenth step of selecting the one-dimensional codes as an output when the information of the one-dimensional codes is not higher than the information amount of the two-dimensional codes; and a sixteenth step of adding a peculiar control code to the coded output of each of the eleventh, fourteenth and fifteenth steps for sending out them after combining into a composite transmission signal.

9. A transmission system for facsimile signal for decoding a coded facsimile signal developed so that the positions of information change picture elements included in a two level facsimile signal, which is obtained by scanning an original picture and successively sampling the scanning output into picture elements, are coded, the improvement of the system comprising:

first circuit for storing information of a scanning line to be coded;

second circuit for storing information of a reference line just decoded;

third circuit for controlling addresses of said first circuit;

fourth circuit for controlling addresses of said second circuit;

fifth circuit for setting a starting picture element on a decoding scanning line from which the decoding starts;

sixth circuit for detecting first, second and third mode codes from the coded facsimile signal;

seventh circuit for detecting a first reference picture element which is a first information change picture element positioned after a picture element just above the starting picture element on the reference scanning line and having a signal value different from that of the starting picture element;

eighth circuit for detecting a second reference picture element which is an information change picture element just succeeding to the first reference picture element;

ninth circuit for decoding a code indicative of a relative distance between the first reference picture element and an information change picture element just succeeding to the starting picture element on the decoding line when the third mode code is detected; and tenth circuit for decoding a code indicative of a relative distance between the starting picture element and an information change picture element just succeeding to the starting picture element on the decoding line when the second mode code is detected.

10. A transmission system for decoding a coded facsimile signal according to claim 9, further including:

eleventh circuit for detecting a first control signal from the coded facsimile signal;

twelfth circuit for detecting a second control signal from the coded facsimile signal; and thirteenth circuit for decoding the coded facsimile signal without reference to the information of the reference scanning line;

fourteenth circuit for detecting code errors.

11. A transmission system for decoding a coded facsimile signal according to claim 9, further including:

eleventh circuit for decoding a code indicative of a relative distance between the starting picture element and a second information change picture element just succeeding to the first information change picture element immediately after the starting picture element on the decoding scanning line when the second mode code is detected.

12. A transmission system for decoding a coded facsimile signal according to claim 11, further including:

twelfth circuit for detecting the first control signal from the coded facsimile signal;

thirteenth circuit for detecting the second control signal from the coded facsimile signal;

fourteenth circuit for decoding the coded facsimile signal without reference to the information of the reference scanning line; and fifteenth circuit for detecting code errors.

* * * * *

UNITED STATES PATENT AND TRADEMARK OFFICE
CERTIFICATE OF CORRECTION

PATENT NO. : 4,245,257
DATED : January 13, 1981
INVENTOR(S) : Yasuhiro Yamazaki, et al It is certified that error appears in the above—identified patent and that said Letters Patent is hereby corrected as shown below:

On the Title page Item [73] Assignee should read:

-- KOKUSAI DENISHIN DENWA KABUSHIKI KAISHA, Tokyo, Japan, NIPPON TELEGRAPH and TELEPHONE PUBLIC CORPORATION, Tokyo, Japan.--

Signed and Sealed this

Twenty-third Day of March 1982

[SEAL]

Attest:

GERALD J. MOSSINGHOFF

Attesting Officer    Commissioner of Patents and Trademarks